United States Patent [19]
Hakemi et al.

[11] Patent Number: 6,049,366
[45] Date of Patent: Apr. 11, 2000

[54] POLYMER STABILIZED LIQUID CRYSTALS AND FLEXIBLE DEVICES THEREOF

[75] Inventors: Hassan-Ali Hakemi, Lissone; Martino Caporusso, Bernalda; Michele Santangelo, Tricarico, all of Italy

[73] Assignee: Sniaricerche S.c.p.A., Pisticci Scalo, Italy

[21] Appl. No.: 08/658,102

[22] Filed: Jun. 4, 1996

[30] Foreign Application Priority Data

Jun. 9, 1995 [IT] Italy ................................. MI95A1226

[51] Int. Cl.[7] ........................ G02F 1/1333; G02F 1/1339
[52] U.S. Cl. ................................ 349/86; 349/90; 349/157
[58] Field of Search .................................. 348/155, 156, 348/157, 86, 89, 90

[56] References Cited

U.S. PATENT DOCUMENTS

| | | | |
|---|---|---|---|
| 3,918,989 | 11/1975 | Gilllman et al. | 429/206 |
| 4,728,547 | 3/1988 | Vaz et al. | 349/89 |
| 4,971,719 | 11/1990 | Vaz et al. | 349/89 |
| 5,021,188 | 6/1991 | Vaz et al. | 349/89 |
| 5,069,533 | 12/1991 | Yuasa et al. | 359/76 |
| 5,073,219 | 12/1991 | McArdle et al. | 156/242 |
| 5,142,644 | 8/1992 | VanSteenkiste et al. | 349/86 |
| 5,225,104 | 7/1993 | Van Steenkiste et al. | 349/89 |
| 5,474,629 | 12/1995 | Yamazaki et al. | 156/99 |
| 5,493,430 | 2/1996 | Lu et al. | 359/68 |
| 5,608,555 | 3/1997 | Onishi et al. | 349/156 |
| 5,638,194 | 6/1997 | Yamada et al. | 349/86 |

FOREIGN PATENT DOCUMENTS

| | | |
|---|---|---|
| 0 205 261 | 12/1986 | European Pat. Off. . |
| 0 313 053 | 4/1989 | European Pat. Off. . |
| 0 321 118 | 6/1989 | European Pat. Off. . |
| 0 523 256 | 1/1993 | European Pat. Off. . |
| 0 563 959 | 10/1993 | European Pat. Off. . |

OTHER PUBLICATIONS

Fuh et al., "Studies of polymer–stabilized cholesteric liquid crystal texture films," *Chinese Journal of Physics*, 33:291–302 (1995).

W.J. Fritz et al., "Reflective color of PSCT displays," *SID International Symposium Digest of Technical Papers*, Proceedings Symposium, San Jose, Jun. 14–16, 1994, 25:841–844.

Marcos et al., "Metallomesogenic Homopolymers. 1. Synthesis and Influence of Metalloorganic Structure on Mesogenic Behavior," *Macromolecules*, 25:5362–5368 (1992).

Oriol et al., "Metallomesogenic Polymers," *Advanced Materials*, 7:348–369 (1995).

*Primary Examiner*—William L. Sikes
*Assistant Examiner*—Dung Nguyen
*Attorney, Agent, or Firm*—Popovich & Wiles, P.A.

[57] ABSTRACT

The present invention is directed to a method for manufacturing polymer stabilized liquid crystals on large flexible films by lamination wherein the polymer stabilized liquid crystals contain microparticles or microspacers. Also, a method for manufacturing polymer stabilized liquid crystals on large flexible films by lamination of substrates having a replicated structure is provided. Polymer-free liquid crystals may also be used in some of the methods of the invention.

43 Claims, 14 Drawing Sheets

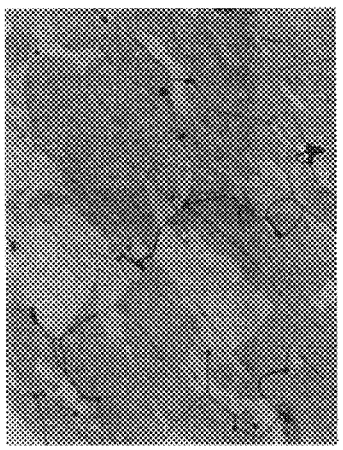 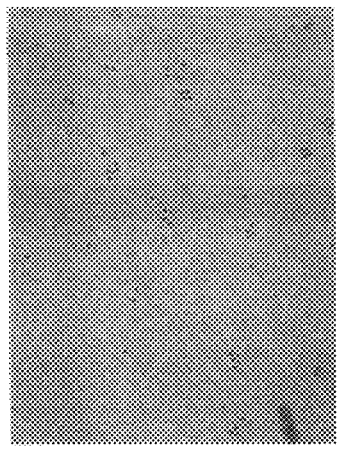 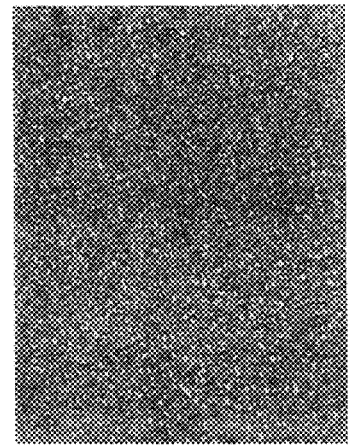
*Fig. 17a*  *Fig. 17b*  *Fig. 17c*

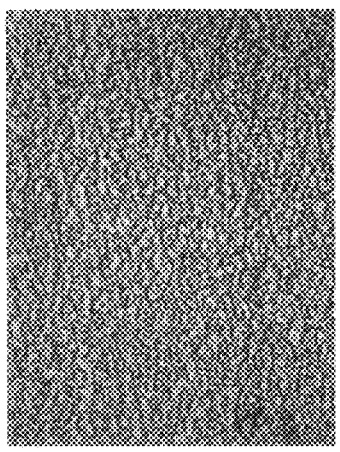 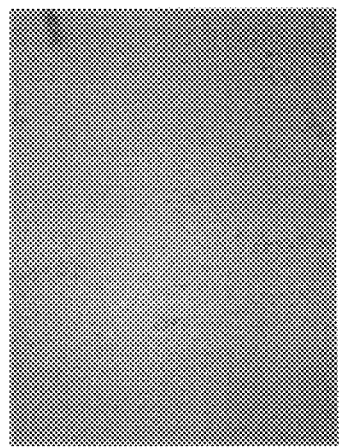 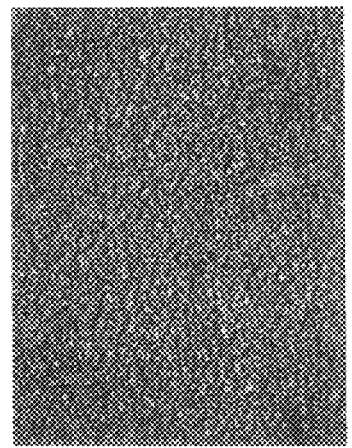
*Fig. 18a*  *Fig. 18b*  *Fig. 18c*

POLYMER STABILIZED LIQUID CRYSTALS AND FLEXIBLE DEVICES THEREOF

BACKGROUND OF THE INVENTION

The present invention relates to polymer stabilized liquid crystals (PSLC's), methods of manufacturing such PSLC's, and fabrication of flexible PSLC films. The present invention also relates to methods of making flexible polymer-free liquid crystal films.

One known method of creating stabilized liquid crystals is Polymer Dispersed Liquid Crystal (PDLC) technology. PDLC technology typically consists of dispersions of liquid crystals microdroplets in a polymer matrix at a liquid crystal concentration range of 30 to 80 weight percent. The liquid crystal is the discontinuous phase and the matrix is the continuous phase. Among the advantages of PDLC films over conventional liquid crystal dispersions (LCD's) are the ease of manufacturing on large roll-to-roll plastic supports and in the manufacture of switchable windows and displays. However, PDLC technology suffers from a number of inherent disadvantages, among which the index mismatching (haze), high voltages required, lack of resin stability, color, and lack of reverse-mode capability (i.e., off-state transparency/on-state opacity) are major problems.

In recent years, another complementary technology to both PDLC and LCD, referred to as Polymer Stabilized Cholesteric Texture (PSCT) has been developed. PSCT is based on colored or non-colored displays prepared by gelification of a mixture of about 5 weight percent ultraviolet radiation-curable prepolymer and greater than 95 weight percent cholesteric liquid crystal. After curing the display consists of a continuous liquid crystal phase stabilized (gelified) by the polymer network. Due to the high concentration of liquid crystal in PSCT, the gel display has to be prepared between rigid sealed glass supports; this requirement is the main disadvantage of this technology for large shutters and displays. In spite of this disadvantage, PSCT has other promising advantages with respect to both LCD and PDLC that can be summarized as follows: (1) haze-free normal-mode and reverse-mode shutters (compared to PDLC); (2) simplicity of fabrication by eliminating the polarizers and dyes (compared to LCD); (3) low voltage requirement (compared to PDLC); and (4) bistability (compared to LCD and PDLC).

Regardless of the method of preparation of the starting materials and processing method, the cholesteric texture in PSCT devices consists of the three basic structures: planar texture, focal conic texture, and homeotropic texture. to create a normal mode PSCT device, a homogeneous mixture of prepolymer (2 weight percent) and cholesteric liquid crystal (98 weight percent) may be filled inside a 5-micron thick sealed glass "bottle" and cured under a magnetic field. After curing and removal of the field (Off-state), the texture of the cholesteric phase (having its pitch in the IR region) becomes polydomains with focal conic texture, and due to intense light scattering, the film shows intense opacity. Upon the application of the field (On-state), the cholesteric pitch unwinds and, by changing to a homoeotropic nematic texture, the film become transparent. As the concentration of polymer gel is low, there will be no index mismatching and the shutter in the On-state is transparent in all viewing directions (haze-free).

To create a reverse mode PSCT film, a homogeneous mixture of an ultraviolet radiation-curable prepolymer (2 weight percent) and cholesteric liquid crystal (98 weight percent) may be filled inside a 5 to 10 micron thick sealed glass bottle and the film cured without any magnetic field. The internal metallized surfaces of the glass supports are coated with polyimide and buffed unidirectionally in order to induce a parallel (planar) alignment of the liquid crystal molecules. After curing, the planar texture of the cholesteric phase (having its pitch in the IR region) shows complete transparency in the field-off state. In the On-state, the field induces a random disorientation of cholesteric pitch axis, causing the establishment of focal conic texture where the film becomes opaque. Due to low concentration of polymer gel, there will be no index mismatching and the shutter in the Off-state is transparent in all viewing directions (haze-free).

In the bistable reflective mode, if the liquid crystal material has a cholesteric pitch in the visible range of light, the display may be driven from a colored reflective mode to a scattering mode to a transparent mode.

The instant invention relates to PSLC films containing microparticles which act as microspacers as well as PSLC films having replicated structures. The present invention also relates to dual-mode and haze-free liquid crystal film technology that has dispersions of mesogenic polymer network in a continuous cholesteric or nematic liquid crystal matrix. The current invention also relates to methods for preparing PSLC on large flexible films by use of binder fixed spacers and by fixed replicated structures made of binder. The invention also relates to methods of making flexible liquid crystal devices containing polymer-free liquid crystal.

SUMMARY OF THE INVENTION

The invention provides a method of making a flexible electrooptical liquid crystal device comprising: (a) placing a fluid liquid crystal composition comprising liquid crystal, a prepolymer, and microparticles between flexible conductive substrates; (b) laminating the substrates together; and (c) curing the fluid liquid crystal composition comprising the prepolymer to form a polymer stabilized liquid crystal. The invention also provides a method of making a flexible electrooptical liquid crystal device comprising: (a) placing a fluid liquid crystal composition comprising a mixture of liquid crystal, a polymer suspended in solvent, and rmicroparticles between flexible conductive substrates; (b) laminating the substrates together; and (c) heating the fluid liquid crystal composition comprising the polymer to form a polymer stabilized liquid crystal.

The invention provides a method of making a flexible electrooptical liquid crystal device comprising the steps of: (a) coating a first conductive flexible film substrate with an adhesive resin; (b) depositing an adhesive resin by screen printing or photoetching on a second conductive flexible film substrate; (c) disposing a fluid liquid crystal composition comprising liquid crystal and a prepolymer between the deposited adhesive resin; (d) laminating the first and second conductive film substrates together; and (e) curing the liquid crystal composition comprising the prepolymer to form a polymer stabilized liquid crystal. The binding of the adhesive resin of one substrate to the adhesive resin of the other substrate forms a spacing structure which holds the two substrates at a distance from each other.

The invention provides a method of making a flexible electrooptical liquid crystal device comprising: (a) placing a fluid liquid crystal composition comprising liquid crystal and microparticles between flexible conductive substrates; (b) laminating the substrates together; and (c) sealing the edges of the substrates so that the liquid crystal remains contained between the substrates. The fluid liquid crystal composition may comprise essentially no polymer or prepolymer.

The invention provides a method of making a flexible electrooptical liquid crystal device comprising the steps of: (a) coating a first conductive flexible film substrate with an adhesive resin; (b) depositing an adhesive resin by screen printing or photoetching on a second conductive flexible film substrate; (c) disposing a fluid liquid crystal composition comprising liquid crystal between the deposited adhesive resin; and (d) laminating the first and second conductive film substrates together. The binding of the adhesive resin of one substrate to the adhesive resin of the other substrate forms a spacing structure which holds the two substrates at a distance from each other. The fluid liquid crystal composition may comprise essentially no polymeric or prepolymeric material.

Additional features and advantages of the invention are set forth in the description which follows and in part will be apparent from the description. The objectives and other advantages of the invention will be realized and attained by the dual mode reservoir and its uses as particularly pointed out in the written description, claims, and appended drawings.

It is to be understood that both the foregoing general description and the following detailed description are exemplary and explanatory and are intended to provide further explanation of the invention as claimed.

BRIEF DESCRIPTION OF THE FIGURES

The present invention with its additional objects and advantages thereof will be best understood from the following description when read in connection with the accompanying drawings.

FIG. 11a shows a cholesteric liquid crystal film containing only liquid crystal and FIG. 11b shows a cholesteric liquid crystal film that is a gel with 90 weight percent liquid crystal.

FIG. 15b shows the ultraviolet radiation mask being placed over the film before ultraviolet curing to produce the device of FIG. 15a.

FIG. 16b shows another view of the film produced by the method shown in FIG. 16a.

FIGS. 17a, 17b, and 17c show a plastic liquid crystal film. FIG. 17a shows the film at zero voltage in the planar texture. FIG. 17b shows the film at 30 volts in the homeotropic phase. FIG. 17c shows the film at zero volts in the focal conic phase.

FIGS. 18a, 18b, and 18c show a plastic liquid crystal film. FIG. 18a shows the film at zero voltage in the planar texture. FIG. 18b shows the film at 30 volts in the homeotropic phase. FIG. 18c shows the film at zero volts in the focal conic phase.

DESCRIPTION OF THE PREFERRED EMBODIMENTS

Figure 1:
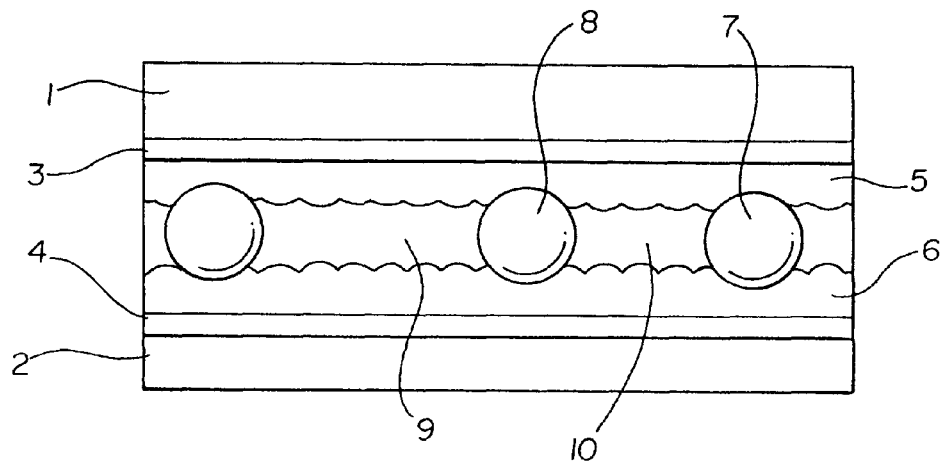
FIG. 1 shows a liquid crystalline device fabricated by the binder-fixed spacers method of the present invention.

The invention provides a method of making a flexible electrooptical liquid crystal device comprising: (a) placing a fluid liquid crystal composition comprising liquid crystal, a prepolymer, and microparticles between flexible conductive substrates; (b) laminating the substrates together; and (c) curing the fluid liquid crystal composition comprising the prepolymer to form a polymer stabilized liquid crystal. The invention also provides a method of making a flexible electrooptical liquid crystal device comprising: (a) placing a fluid liquid crystal composition comprising a mixture of liquid crystal, a polymer suspended in solvent, and microparticles between flexible conductive substrates; (b) laminating the substrates together; and (c) heating the fluid liquid crystal composition comprising the polymer to form a polymer stabilized liquid crystal.

The invention provides a method of making a flexible electrooptical liquid crystal device comprising the steps of: (a) coating a first conductive flexible film substrate with an adhesive resin; (b) depositing an adhesive resin by screen printing or photoetching on a second conductive flexible film substrate; (c) disposing a fluid liquid crystal composition comprising liquid crystal and a prepolymer between the deposited adhesive resin; (d) laminating the first and second conductive film substrates together; and (e) curing the liquid crystal composition comprising the prepolymer to form a polymer stabilized liquid crystal. The binding of the adhesive resin of one substrate to the adhesive resin of the other substrate forms a spacing structure which holds the two substrates at a distance from each other.

The invention provides a method of making a flexible electrooptical liquid crystal device comprising: (a) placing a fluid liquid crystal composition comprising liquid crystal and microparticles between flexible conductive substrates; (b) laminating the substrates together; and (c) sealing the edges of the substrates so that the liquid crystal remains contained between the substrates. The fluid liquid crystal composition may comprise essentially no polymer or prepolymer.

The invention provides a method of making a flexible electrooptical liquid crystal device comprising the steps of: (a) coating a first conductive flexible film substrate with an adhesive resin; (b) depositing an adhesive resin by screen printing or photoetching on a second conductive flexible film substrate; (c) disposing a fluid liquid crystal composition comprising liquid crystal between the deposited adhesive resin; and (d) laminating the first and second conductive film substrates together. The binding of the adhesive resin of one substrate to the adhesive resin of the other substrate forms a spacing structure which holds the two substrates at a distance from each other. The fluid liquid crystal composition may comprise essentially no polymeric or prepolymeric material.

Where the fluid liquid crystal composition comprises a prepolymer, it is preferred that the prepolymer be present at 5 to 30 weight percent. In another embodiment, the prepolymer may be present at 0.1 to 5 weight percent. The prepolymer may be cured by ultraviolet radiation or heat treatment. The prepolymer may be mesogenic or non-mesogenic.

The prepolymer may be cured by ultraviolet radiation in two steps. In the first step, a mask is placed over the laminated substrates and the laminated substrates are selectively exposed to ultraviolet radiation. In the second step, the mask is removed and the laminated substrates are exposed to ultraviolet radiation. The ultraviolet radiation in the first step preferably is of higher intensity than the ultraviolet radiation in the second step.

When microparticles are used, the microparticles preferably have a particle size of from 5 to 50 microns. The microparticles preferably are selected from microspheres or microrods. The microparticles may be coated with adhesive.

The flexible conductive substrates may comprise an adhesive layer. The lamination of the substrates preferably occurs at a temperature of from 20 to 100 C. The flexible conductive substrates preferably are polymeric and have a thickness of from 50 to 200 microns. In a preferred embodiment, the flexible conductive substrate is a polyethylene terephthalate film coated with indium-tin oxide. In another preferred embodiment, at least one of the flexible conductive substrates comprises a double-sided adhesive tape.

The flexible electrooptical device is a reverse mode or normal mode device. The liquid crystal preferably is a mixture of a nematic liquid crystal and a chiral component.

In a preferred embodiment, wherein the fluid liquid crystal composition is placed between two flexible conductive substrates by forming at least one liquid crystalline layer on at least one of the two flexible conductive substrates by applying the fluid liquid crystal composition on an exposed surface of one of the flexible substrates; and the two flexible conductive substrates are then laminated together with at least one liquid crystalline layer arranged between the flexible substrates to form a laminate.

The invention also provides a flexible electrooptical liquid crystal device comprising: (a) a pair of flexible conductive substrates each having an electrode layer formed thereon, the electrode layers opposed to each other; (b) a polymer stabilized liquid crystal composition disposed between the flexible substrates; and (c) a spacing structure formed of adhesive of one substrate bound to adhesive of the other substrate is disposed between the two substrates and a laminate layer surrounding the substrates. The spacing structure and laminate layer hold the opposed substrates at a distance from each other.

The invention provides a flexible electrooptical liquid crystal device comprising: (a) a pair of flexible conductive substrates each having an electrode layer formed thereon, said the electrode layers opposed to each other; (b) a polymer stabilized liquid crystal composition comprising microparticles having a particle size in the range of 5 to 50 microns, the composition disposed between the flexible substrates; and (c) laminate layers disposed between the substrates and the polymer stabilized liquid crystal composition. The laminate layers and the microparticles hold the opposed substrates at a distance from each other.

The invention provides a polymer stabilized liquid crystal composite comprising a liquid crystal continuous phase and a mesogenic polymer discontinuous phase, wherein the liquid crystal continuous phase is present in a concentration range of 70 to 95 weight percent and the mesogenic polymer discontinuous phase is present in a concentration range of 5 to 30 weight percent.

The invention provides polymer stabilized liquid crystals dispersed in a mesogenic polymer network in a continuous cholesteric liquid crystal matrix. The invention also provides polymer stabilized liquid crystals dispersed in a polymer network, especially a mesogenic polymer network in a continuous nematic liquid crystal matrix.

The invention provides a dual mode liquid crystal film technology that consists of dispersions of mesogenic polymer network in a continuous cholesteric liquid crystal matrix. The invention also provides a dual mode liquid crystal film technology that consist of dispersions of a mesogenic polymer network in a continuous nematic liquid crystal matrix.

The invention provides a haze-free liquid crystal film technology that consists of dispersions of a mesogenic polymer network in a continuous cholesteric liquid crystal matrix. The invention also provides a haze-free liquid crystal film technology that consists of dispersions of a mesogenic polymer network in a continuous nematic liquid crystal matrix.

The electrooptical devices of the invention may be used as internal and external privacy panels or windows for buildings in general such as in offices, hospitals, banks, restaurants and homes; as solar central windows such as skylights, shape glazing, and the like for office and residential buildings; as light and/or energy control shutters for external and internal use; as privacy and light control windows in transportation vehicles such as airplanes, automobiles, trucks and ships; and dynamic road, street, station, sporting event and airport signs, as well as advertising billboards, large and small, low and high definition displays such as billboards, television and advertising, and the like.

The instant invention is also directed to a haze-free polymer stabilized liquid crystal composite comprising 70 to 100 weight percent of a liquid crystal continuous phase and 0 to 30 weight percent of a polymer discontinuous phase. In preferred embodiments, the polymer is a mesogenic polymer and the liquid crystal continuous phase is present at 70 to 95 weight percent and the polymer discontinuous phase is present at 5 to 30 weight percent.

In one of the preferred embodiments of the present invention, a dual mode and haze-free liquid crystal film technology is provided that consists of dispersions of a mesogenic polymer network in a continuous cholesteric or nematic liquid crystal matrix. This technology is referred to as polymer stabilized liquid crystals (PSLC's). The liquid crystal materials are usually organic in nature.

Typical organic classes of liquid crystal forming materials comprise both aromatic and aliphatic organic compounds such as benzylideneanilines, generally prepared from the reaction of para-substituted benzaldehyde and parasubstituted aniline; N-(p-alkoxybenzylidene)-p-amiostyrenes, prepared from the reaction of the appropriate aldehyde with p-aminostyrene; derivatives of beta sitosterol; active amyl ester of cyano benzylidene amino-cinnamate; p-phenylene containing compounds such as p-phenylene p-alkoxybenzoates; aminoacetophenones; aminopropiophenones; phenylenediamines; chlorophenylenediamines; terephthals; p,p'-disubstituted diphenylacetylenes; p,p'-disubstituted-1,4-diphenylbutadienes; p,p'-diisubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

Specific liquid-crystal compounds include ethyl p-4-ethoxybenzylideneaminocinnamate; p,p'-azoxybenzoic acid diethyl ester; N-(p-methoxybenzylidene)-p-aminostyrene; N-(p-butoxybenzylidene)-p-aminostyrene; p-azoxyanisole; p-hexyloxybenzalazine; p-azoxy-phenetole; p-anisylidene-p-biphenylamine; p-ethoxybenzylindene-p-biphenylamine; p-anisylidene-p-aminophenyl acetate; p-ethoxybenzylidene-p-aminophenyl acetate; p-n-hexyloxybenzylidene-p-aminophenyl acetate; p-n-hexoloxybenzylidene-p-aminophenyl acetate; deca-2,4-dienoic acid; 4,4' di-n-heptoxyazoxybenzene; 4,4' di-n-pentoxyazoxybenzene; 4,4' di-n-butoxyazoxybenzene; 4,4'diethoxy-azoxybenzene; undeca-2,4-dienoic acid; nona-2,4-dienoic acid; 4,4' dimethoxystilbene; 2,5-di(p-ethoxybenzylidene) cyclopentanone; 2,7-di-(benzylideneamino)fluorene; 2-p-methoxybenzylideneamino-phenanthrene; 4-methoxy-4"-nitro-p-terphenyl; 4-p-methoxybenzylideneaminobiphenyl; 4,4'-di(benzylideneamino)biphenyl; p-n-hexylbenzoic acid; p-n-propoxybenzoic acid; trans-p-methoxycinnamic acid; 6-methoxy-2-naphtholic acid; p-phenylene di-p-anisate; p-phenylene di-p-ethoxybenzoate; p-phenylene di-p-n-hexyloxybenzoate; p-phenylene di-p-n-heptyloxybenzoate; p-phenylene di-p-n-octyloxybenzoate; 1,4-bicyclo[2.2.2.] octylene di-p-anisate; 1,4-bicyclo[2.2.2]octylene di-p-n-octyloxybenzoate; trans-1,4-cyclohexylene di-p-n-butoxybenzoate; 4,4'-di(p-methoxybenzylideneamino) dibenzyl; p,p'-diacetoxystilbene; 1,2-di(p-methoxyphenyl)-acetylene; p-(p-acetoxyazo)benzoic acid; 1,4-di-(p-methoxyphenyl)-butadiene; p-anisal-p-anisidine; p,p'-dimethoxydibenzal-1,4-naphthalenediamine; p-n-butylbenzoic acid; p,p'-di-n-butyldiph-enylpyridazine; p-(p-cyanobenzal) anisdine; p-(p-methoxybenzoxy benzoic acid, anisal-p-aminozobenzene; 1-(4'-anisalamino)-4-phenylazonaphthalene; N-(p-methoxybenzylidene)-p-n-butylaniline; N-(p-n-octyloxybenzylidene)-p-n-butylaniline; p-anisylidene-p-phenylazoaniline; N,N'-dibenzylidenebenzidine; N,N'-di(p-n-hexyloxybenzylidene) benzidine; p-bis(heptyloxybenzoyloxy)benzene; p-n-propoxybenzoic acid; p-n-butoxybenzoic acid; p-n-amyloxybenzoic acid; p-n-hexyloxybenzoic acid; p-n-heptyloxybenzoic acid; p-n-octyloxybenzoic acid; butyl-p-(p-ethoxyphenoxycarbonyl)phenylcarbonate; p-(p-ethoxy-phenylazo)-phenylheptanoate; 4-[(p-hexyloxycarbonyloxybenzylidene)amino]-1-pentyloxybenzene; N-p-(pentyloxycarbonyloxy) benzylidene]-p-anisidine; p-[(p-butoxyphenyl)azo]phenyl butyl carbonate; p-(p-ethoxyphenylazo)phenyl hex-anoate; p-(p-ethoxy-phenylazo)phenyl valerate; p-[(p-ethoxybenzylidene)amino]benzonitrile; p-[(p-methoxybenzylidene)amono]benzonitrile; ethyl p-[(p-methoxybenzylidene)amino]cinnamate; p-(p-ethoxyphenylazo)-phenyl crotonate; p-[(p-methoxybenzylidene)amino]-phenyl p-toluate; p-[(p-methoxybenzylidene)amino]-phenylbenzoate; p-[(p-ethoxybenzylidene)amino] phenylbenzoate; N,N'-di(p-methoxybenzylidene)-α,α'-biptoluidine; p-anisalazine; 4-acetoxy-3-methoxycinnamic acid; p-acetoxycinnamic acid; 4'-[(p-pentyloxycarbonyloxybenzylidene)aminovalerophenonel diethyl p,p'-azoxydicinnammate; 4-butoxybenzylidene-4'-aminoacetophenone; 4-decyloxybenzylidene-4'-aminoacetophenone; 4-dodecyloxybenzylidene-4'-aminoacetophenone; 4-heptyloxybenzylidene-4'-aminoacetophenone; 4-hexyloxybenzylidene-4'-aminoacetophenone; 4-methoxybenzylidene-4'-aminoacetophenone; 4-nonyloxybenzylidene-4'-aminoacetophenone; 4-octyloxybenzlidene-4'-aminoacetophenone; 4-pentyloxybenzylidene-4'-aminoacetophenone; 4-propoxybenzylidene-4'-aminoacetophenone; 4-butoxybenzylidene-4'-aminopropiophenone; 4-heptyloxybenxylidene-4'-aminopropiophenone; 4-hexyloxybenzylidene-4'-aminopropiophenone; 4-methoxybenzylidene-4'-aminopropiophenone; 4-nonyloxybenzylidene-4'-aminopropiophenone; 4-octyloxybenzylidene-4'-aminopropiophenone; 4-pentyloxybenzyidene-4'-aminopropiophenone; 4-propoxybenzylidene-4'aminopropiophenone; bis-(4-bromobenzylidene)-2-chloro-1,4-phenylenediamine; bis-(4-chlorobenzylidene)-2-chloro-1,4-phenylenediamine; bis-(4-n-decyloxybenzylidene)-2-chloro-1,4-phenylenediamine; bis-(4-n-dodecyloxybenzylidene)-2-chloro-1,4-phenylenediamine; bis-(4-n-hexyloxybenzylidene)-2-chloro-1,4-phenylenediamine; bis-(4-methoxybenzylidene)-2-chloro-1,4-phenylenediamine; bis-(4-nonyloxybenzylidene)-2-chloro-1,4-phenylenediamine; bis-(4-n-octyloxybenzylidene)-2-chloro-1,4-phenylenediamine; bis-(4-n-pentyloxybenzylidene)-2-chloro-1,4-phenylenediamine; bis-(4-bromobenzylidene)-1,4-phenylenediamine; bis-(4-chlorobenzylidene)-1,4-phenylenediamine, bis-(4-n-decyloxybenzylidene)-1,4-phenylenediamine; bis(4-n-dodecyloxybenzlidene)-1,4-phenylenediamine; bis-(4-fluorobenzylidene)-1,4-phenylenediamine; bis-(4-n-heptyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-octyloxy-benzylidene)-1,4-phenylenediamine; bis-(4-n-pentyloxybenzylidene)-1,4-phenylenediamine; terephthal-bis-(p-bromoaniline); terephthal-bis-(p-chloroaniline); terephthal-bis-(p-fluoroaniline); terephthal-bis-(p-iodo-aniline), and the like.

Nematic liquid crystalline materials suitable for use with the organometallic liquid crystals include: p-azoxyanisole, p-azoxyphenetole, p-butoxybenzoic acid, p-methoxycinnamic acid, butyl-p-anisylidene-p-aminocinnamate, anisylidene p-amino-phenylacetate, p-ethoxy-benzal-amino-α-methyl-cinnamic acid, 1,4-bis(p-ethoxybenzylidene) cyclohexanone, 4,4'-dihexyloxybenzene, 4,4'-diheptyloxybenzene), anisal-p-amino-azo-benzene, anisaldazine, α-benzene-azo-(anisal-α'-naphthylamine), n,n'-nonoxybenzetoluidine; anilines of the generic group (p-n-alkoxybenzylidene-p-n-alkylanilines), such as p-methoxybenzylidene p'-n-butylaniline, p-n-butoxybenzylidene-p'-aminophenylacetate, p-n-octoxybenzylidene-p'-aminophenylacetate, p-n-benzylideneproprionate-p'-aminophenylmethoxide, p-n- anixylidene-p'-aminophenylbuterate, p-n-butoxybenzylididene-p'-aminophenylpeatoate and mixtures thereof. Conjugated cyano-organic compounds that are useful are 7,7',8,8'-tetracyanoquinodimethane (TCNQ), (2,4,7,-trinitro-9-fluorenylidene)-malono-nitrile (TFM), p-[N-(p'-methoxybenzylidene)amino]-n-butyl-benzene (MBBA), p-[N-(p'-ethoxybenzylidene)amino]-butylbenzene (EBBA), p-[N-(p'-methoxybenzylidene)amino]phenyl butyrate n-butyl-p-(p'-ethoxyphenoxycarbonyl)phenylcarbonate, p-methoxy-p'-n-butylazoxybenzene, p-ethoxy-p'-n'-butylazobenzene, p-[N-(p'-methoxybenzylidene)amino] benzonitrile (BBCA), p-[N-(p'-methoxybenzylidene)amino] benzonitrile (BBCA), p-[N-(p'-hexylbenzylidene)amino] benzonitrile (HBCA), pentylphenylmethoxy benzoate, pentylphenylpentyloxy benzoate, cyanophenylpentyl benzoate, cyanophenylheptyloxy benzoate, cyanophenyloctyloxy benzoate, cyanophenylmethoxy benzoate, and the like.

Desirable nematic liquid crystals frequently comprise cyanobiphenyls, and may be mixed with cyanoterphenyls and with various esters. There are commercially available nematic type liquid crystal mixtures, such as liquid crystal mixture "E7" (Licrilite® BL001 from E. Merck, Darmstadt, Germany, or its subsidiaries such as EM Industries, Hawthorne, N.Y. and Merck Industrial Chemical, Poole, England) that is a mixture of (by weight), 51% 4'-n-pentyl-n-cyanobiphenyl (5CB), 21% 4'-n-heptyl-n-cyanobiphenyl (7CB), 16% 4'-n-octoxy-4-cyanobiphenyl, 12% and 4'-n-pentyl-4'-n-pentyl-4-cyanoterphenyl that has a crystal to nematic liquid crystal phase transition temperature of –10° C. and a liquid crystal to isotropic phase transition temperature of 60.5° C. Illustrative of other such commercial liquid crystal mixtures are the following.

E-31 is a proprietary mixture of cyanobiphenyls and a non-cyano biphenyl ester available from E. Merck, supra, and having a crystal to nematic liquid crystal phase transition temperature of –9° C. and a liquid crystal to isotropic phase transition temperature of 61.5° C. E-44 is a proprietary mixture of cyanobiphenyls, a cyanoterphenyl and a non-cyano biphenyl ester available from E. Merck, supra, and having a crystal to nematic liquid crystal phase transition temperature of –60° C. and a liquid crystal to isotropic phase transition temperature of 100° C. E63, from E. Merck, supra, is a liquid crystal mixture that is similar to the E7 with added cyclohexanes. It contains: significant amounts of the commonly known liquid crystal component 5CB, 7CB, lesser amounts of 5CT, lesser amounts of Benzonitrile-4-(4 propyl-1-cyclohexen-1-yl), commonly known as PCH3, lesser amounts of 4-carbonitrile-4'(4-pentyl-1-cyclohexen-1-yl)-1, 1'-biphenyl, commonly known as BCH5, and still lesser amounts of [1,1'-Biphenyl]-4-carboxylic acid, 4'-heptyl-4'-cyano[1,1'-biphenyl]-4-yl ester, commonly known as DB71. K-12 is 4-cyano-4'-butylbiphenyl and has a crystal to nematic liquid crystal phase transition temperature of 48° C. K-18 is 4-cyano-4'-hexylbiphenyl and has a crystal to nematic liquid crystal phase transition temperature of 14.5° C. and a liquid crystal to isotropic phase transition temperature of 29° C. K-21 is 4-cyano-4'-heptylbiphenyl and has a crystal to nematic liquid crystal phase transition temperature of 30° C. K-24 is 4-cyano-4'-octylbiphenyl and has a crystal to smectic A liquid crystal phase transition temperature of 21.5° C., a smectic C to nematic liquid crystal phase transition temperature of 33.5° C. and a nematic liquid crystal to isotropic phase transition temperature of 40.5° C. M-15 is 4-cyano-4'-pentoxybiphenyl and has a crystal to nematic liquid crystal phase transition temperature of 48° C. and a liquid crystal to isotropic phase transition temperature of 68° C. M-18 is 4-cyano-4'-hexoxybiphenyl and has a crystal to nematic liquid crystal phase transition temperature of 57° C. and a liquid crystal to isotropic phase transition temperature of 75.5° C. M-24 is 4-cyano4'-octoxybiphenyl and has a crystal to smectic A liquid crystal phase transition temperature of 54.5° C., a smectic A to nematic liquid crystal phase transition temperature of 54.5° C., a smectic A to nematic liquid crystal phase transition temperature of 67.0° C. and a nematic to isotropic phase transition temperature of 80.0° C. Other desirable Licrilite® liquid crystal mixtures include BL003, BL004, BL009, BL011, BL012, BL032, BL036, BL037, BL045, BL046, ML-1001, ML-1002, as well as TL202, TL203, TL204 and TL205, all obtainable from E. Merck, supra.

TOTN404, available from Hoffman-LaRoche, Basel, Switzerland and Nutley, N.J., is a liquid crystal mixture similar to E7 but with added pyrimidines. It contains approximately 30 weight percent of 4-carbonitrile,4'-pentyloxy-1,1'-biphenyl commonly known as 5OCB, 14 weight percent of 4-carbonitrile,4'-octyloxy-1,1'-Biphenyl, commonly known as 8OCB, 10 weight percent of 4-carbonitrile-4"-pentyl-1,1',4',1"-terphenyl, commonly known as 5CT, 10 weight percent of 4-(4-pentyl-2-pyrimidimyl)-benzonitrile, commonly known as RO-CP-7035, 20 weight percent of 4-(4-heptyl-2-pyrimidimyl) benzonitrile, commonly known as RO-CP-7037, and 15 weight percent of 4-[5-(4-butylphenyl)-2-pyrimidinyl] benzonitrile, commonly known as RO-CM-7334.

ROTN-570, available from Hoffman-LaRoche is a cyano-biphenyl liquid crystal mixture comprises 51 weight percent of 4-cyano-4'-pentylbiphenyl, 25 weight percent of 4-cyano-4'-heptylbiphenyl, 16 weight percent of 4-cyano4'-octyloxybiphenyl, and 8 weight percent of 4-cyano-4'-pentyl-p-terphenyl. Other desirable liquid crystal mixtures include TNO623 and TN10427, both from Hoffman-LaRoche.

Polymer matrices that may be used in the present invention are UV-curable and thermoset mesophase matrices, in particular UV curable metalloorganic mesogens (MOM's) and liquid crystal epoxy resin systems (LCER's).

Liquid crystalline thermosettable epoxy resins (LCER's) are well known in the art but have heretofore never been applied to the technology of polymer dispersed liquid crystal composites as main chain components of the thermoset in the polymer continuous phase matrix. The LCER's are known to exhibit enhanced thermal and mechanical properties, and have been shown to enhance tensile and flexural strength/modulus compared with conventional epoxy resin. See Hefner, Jr. et al., U.S. Pat. No. 4,962,163.

LCER's may be obtained by endcapping mesogenic or rigid-rod molecules with reactive epoxy groups in the presence of a suitable curing agent, typically a diamine. It is known that a mesogenic molecular arrangement is sustained over the cross-linking reaction when the reaction is performed in the thermal stability range of the liquid crystalline phase. See Carfagna et al., Liq. Cryst., 13(4), pp. 571–584 (1993). It is further known that the selection of both the glycidyl terminated component and the curing agent is important to achieve an ordered thermoset and that it is not essential that the epoxy monomer and the curing agent form a nematic phase by themselves.

The preferred LCER's are generally of the formula:

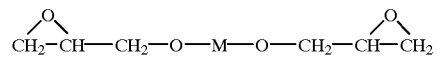

wherein M is a group containing two or more aromatic rings bridged by a rigid central linkage group and said central linkage group is selected from the group consisting of a direct bond, or a $-CR_1=CR_1-$, $-C\equiv C-$, $-N=N-$, $CR_1=N$, $-CR_1=N-N=CR_1-$, $-CR_1=CR_1-CO-$, $-O-CO-NR_1-CO-$, $-N=CR_1-$, $-CO-O-CO-NR_1$, $-CO-CR_1=CR_1-$, $-CO-O-N=CR_1$, CR$_1$=N—O—OC—, —CO—NR$_1$—NR$_1$—OC—,
—CH=CH—O—OC—, —CO—O—CH=CH—,
—O—OC—CH=CH—, —CH=CH—CO—O—,
CHR$_1$O—CO—CH=CH—, —CH=CH—CO—O—
CHR$_1$, —CHR$_1$—CO—O—CH=CH—, —CH=CH—
O—CO—CHR$_1$—, —CO—S—, —S—OC—, =CH$_2$—
CH$_2$—O—O—, —O—OC—CH$_2$—CH$_2$—, —C≡C—
C≡C—, —CR$_1$=CR$_1$—CR$_1$=CR—,

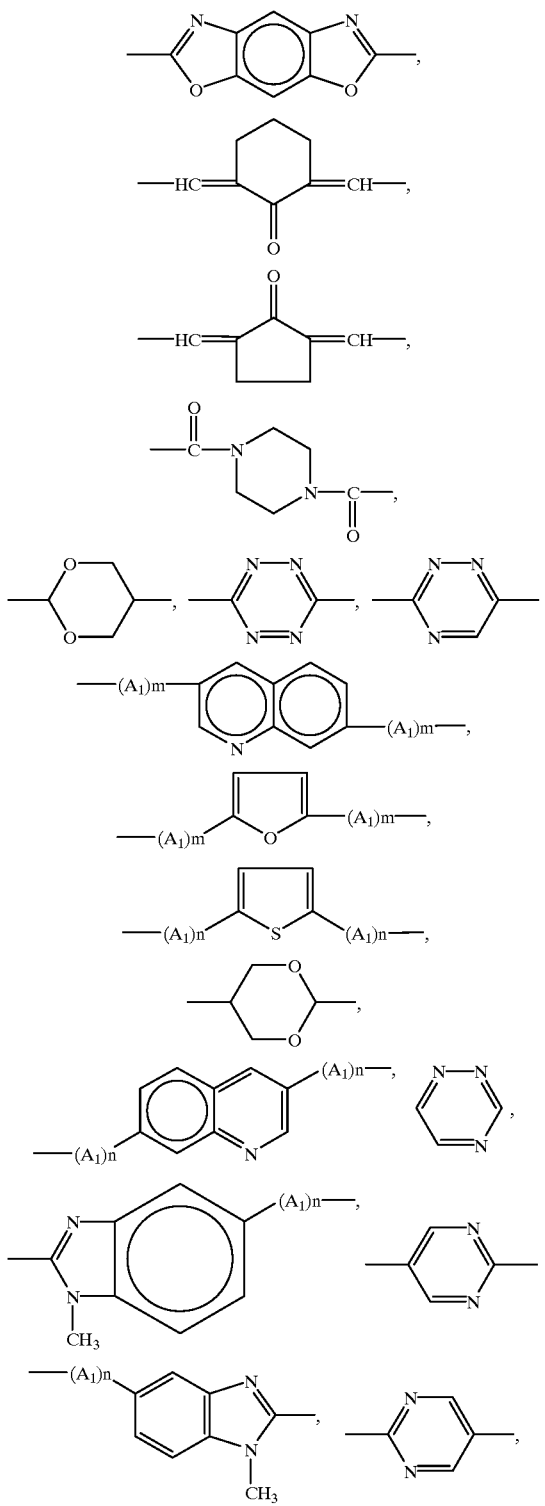

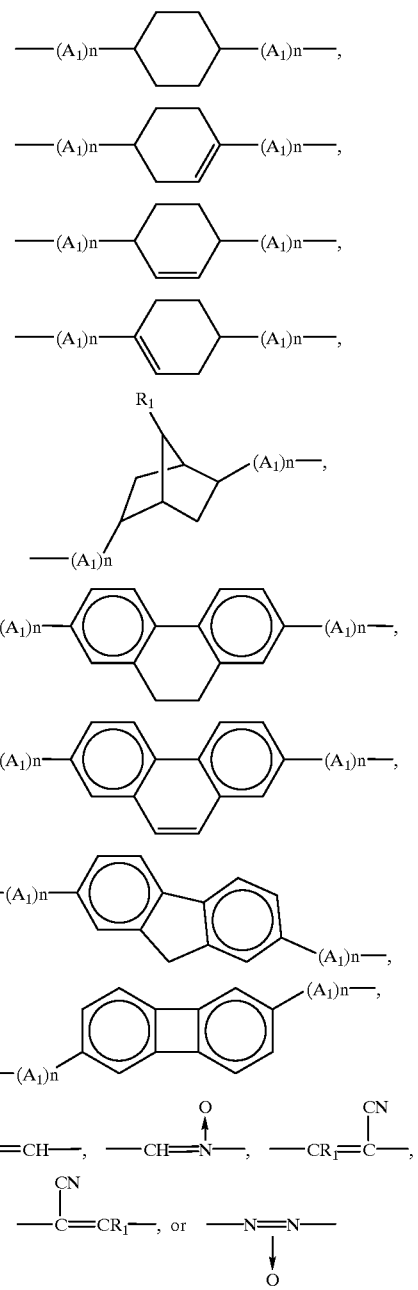

wherein each A$_1$ is independently a

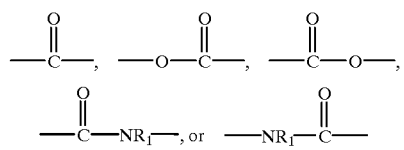

group; each R$_1$ is independently hydrogen or a hydrocarbyl group having 1–3 carbon atoms and the aromatic rings can also contain one or more heteroatoms selected from the group consisting of N, O, S.

Particularly, useful LCER's are ones having the following formulas:

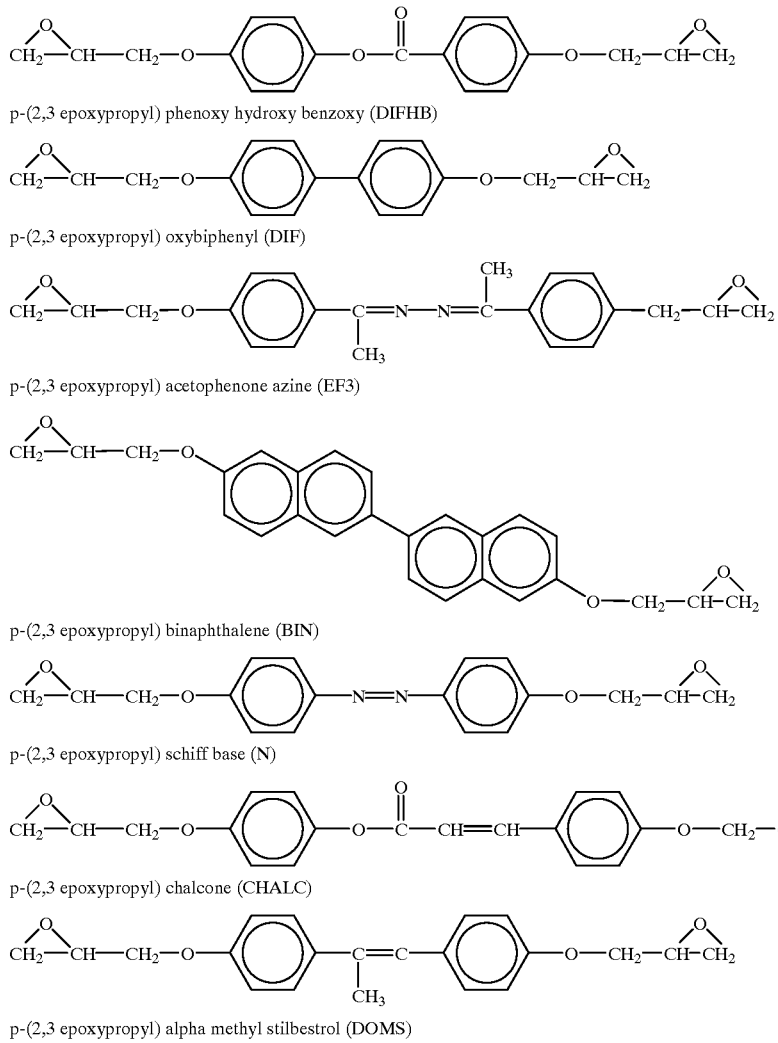

p-(2,3 epoxypropyl) phenoxy hydroxy benzoxy (DIFHB)

p-(2,3 epoxypropyl) oxybiphenyl (DIF)

p-(2,3 epoxypropyl) acetophenone azine (EF3)

p-(2,3 epoxypropyl) binaphthalene (BIN)

p-(2,3 epoxypropyl) schiff base (N)

p-(2,3 epoxypropyl) chalcone (CHALC)

p-(2,3 epoxypropyl) alpha methyl stilbestrol (DOMS)

The preferred curing agents for use in conjunction with the LCER are 1,3-diamine toluene (PAT) and p,p'-diaminodimethylbenzalazine.

The preferred UV curable metalloorganic mesogens (MOM'S) are those having the formula:

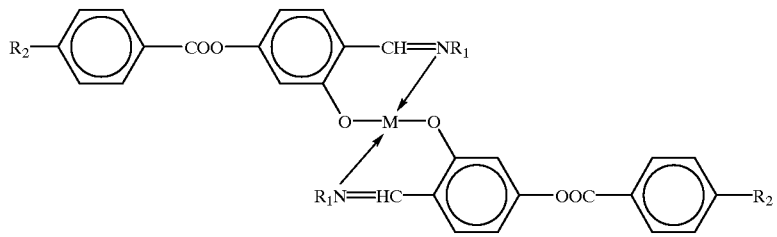

wherein M is a metal selected from the group consisting of Cu, Pd, Ni and V and $R_1$ is selected from the group consisting of —$(CH_2)_7CH_3$;
—$(CH_2)_3OCH_2CH_3$ and
$R_2$ is $CH_2$=$CHCOO(CH_2)_6O$—.

Other MOM's contemplated by the present invention include compounds having the following chemical structures:
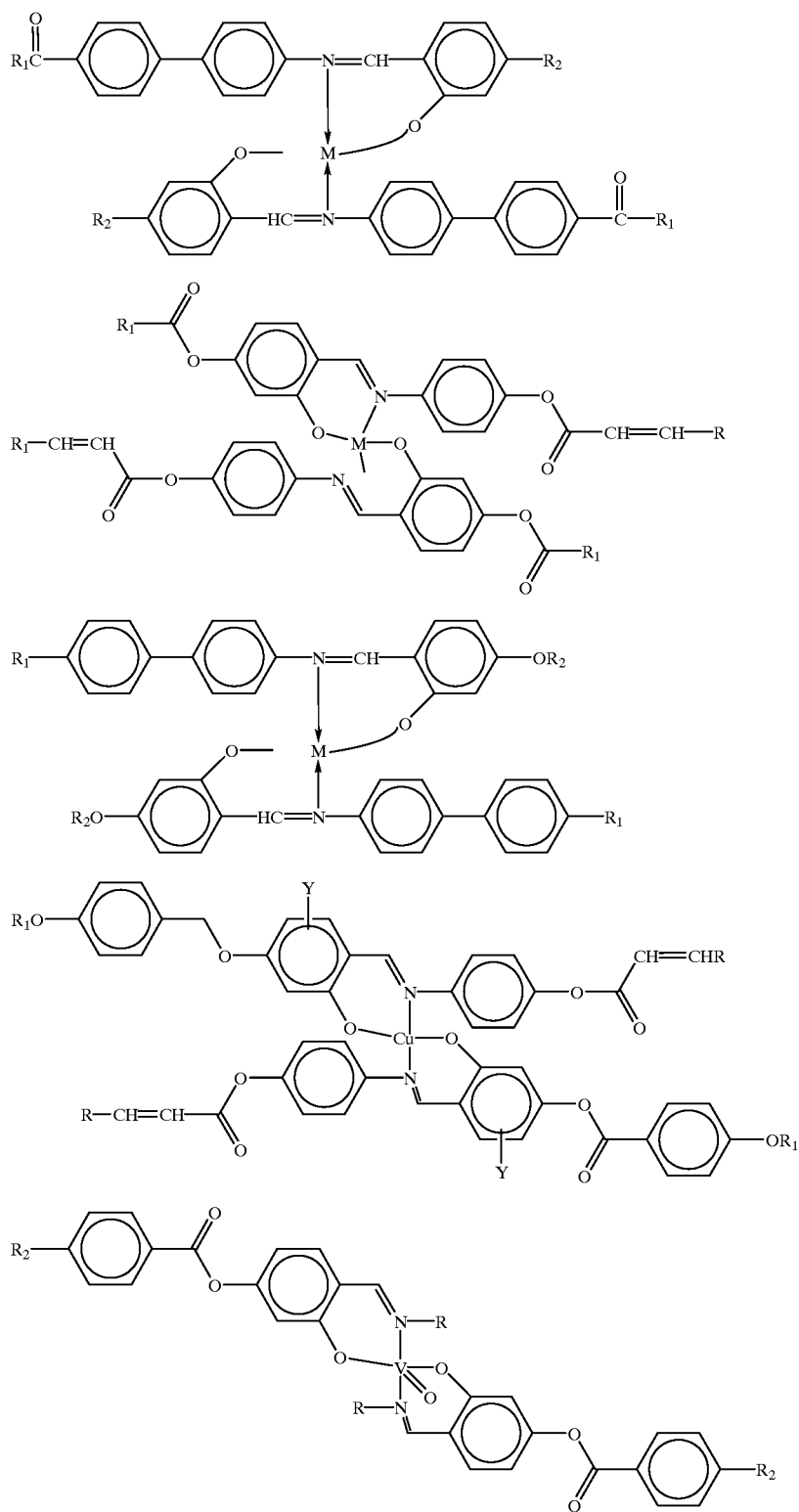

-continued

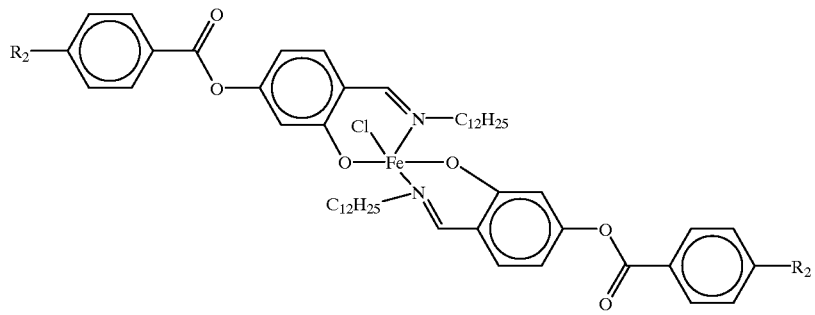

wherein R is a $C_1$–$C_{10}$ branched or unbranched alkyl group, Y is a $C_1$–$C_4$ alkyl group and $R_1$ and $R_2$ are as defined above. Other compounds that can be used in connection with the present invention are selected from the group consisting of

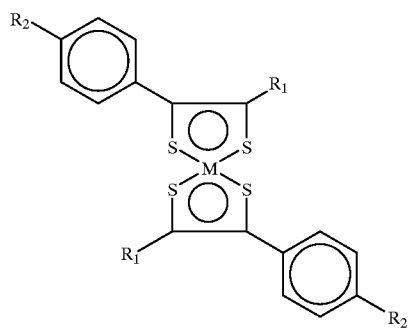

wherein M is preferably Pt, Co, V, and $R_1$ and $R_2$ are as defined above;

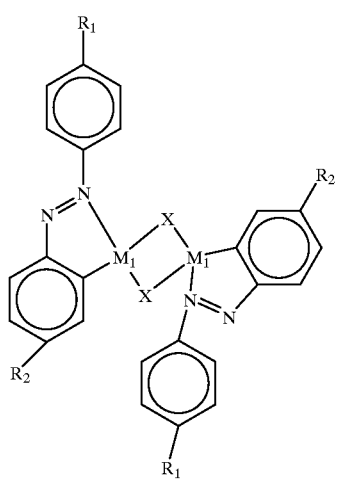

wherein $R_1$ and $R_2$ are as defined above, X is halogen and $M_1$ is selected from the group consisting of Pd, Pt and Au;

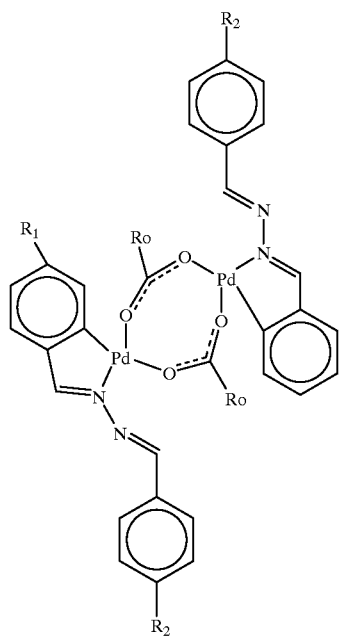

wherein R1 and R2 are as defined above, Ro is

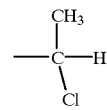

or $OC_mH_{2m+1}$, where m is 1 through 20;

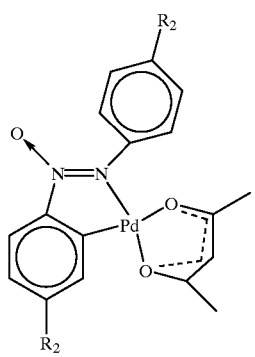

-continued

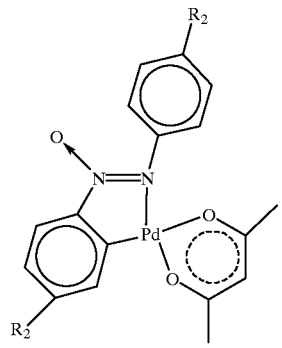

wherein $R_2$ is as defined above.

Other polymers that may be used include UV curable acrylates. Suitable commercially available acrylates include CN934, CN94760, CN970A60, CN945B85, and UVS-500, available from Croda Resins; EBECRYL resin 284 and 810, available from UCB Chemicals; and the Photometric 6000 Series (6010, 6210, 6008, etc.), available from Henkel.

The invention further relates to a method for making a polymer stabilized liquid crystal composite. The method involves the step of preparing a mixture containing (a) a liquid crystalline epoxy resin prepolymer or a metalloorganic mesogen, (b) a low molecular weight liquid crystal material, and (c) a curing agent, wherein (a), (b) and (c) are miscible. The method further involves the step of curing the mixture to form a liquid crystal continuous phase and a mesogenic polymer discontinuous phase.

The polymer concentration of the invention is within the 0 to 30 percent range by weight; where a polymer is used, a preferable range is 5 to 30 weight percent. Although applicant does not want to be bound by theories regarding mechanisms of the invention, applicant believes that in the present invention a reverse morphology is obtained thereby giving rise to dispersions of a polymer discontinuous phase in a continuous liquid crystal matrix.

By the above method a new types of electro-optical films were prepared by dispersing some liquid crystal epoxy resins (LCER's) at low concentration in a cholesteric liquid crystal. These films can work as a reverse mode shutter, which is transparent in the field-OFF state and opaque in the field-ON state, and as a normal mode shutter, which is opaque in the field-OFF state (at low voltages in this case) and transparent in the field-ON state. The transparent state is haze-free for all directions of incident light. The films also show a memory effect, remaining unchanged in the transparent state or in the opaque state depending on the manner in which the field is turned-OFF. The memory effect in this type of films is more pronounced with respect to the liquid crystal devices (LCD's), which show bistable properties.

The PSLC composites and materials of the present invention overcome the limitations of the prior art and also show bistable properties that make them useful as an active matrix in information display applications. The concentration of the polymer is low (preferably 5–30%) but is enough to make homogeneous films that are not susceptible to mechanical stress as liquid crystal devices.

Applicant's innovation leads to a good working system that works without any surface treatment either in the normal mode or in the reverse mode, depending on the voltage applied to the system.

The method of the present invention further includes in the composition microparticles having a diameter in the range of 5 to 50 microns. The compositions containing the microparticles may be made by preparing a mixture containing (a) a liquid crystalline epoxy resin prepolymer, (b) a low molecular weight liquid crystal material, (c) a curing agent and (d) microspacers such as nylon micro-pearl spacers.

The performance of the resulting composites of the present invention is superior to composites of the prior art. Due to the relatively higher concentration with respect to PSCT gel, the PSLC films made on glass substrates exhibit the "self-sustaining" effect, particularly at 15 to 20 weight percent polymer content. Shutters and displays may be produced on flexible plastic (ITO-PET) films.

With the studied prepolymer/liquid crystal systems, the PSLC films demonstrate to be "haze-free" in all studied concentrations. The bistability phenomenon of PSLC provides the possibility of preparing switchable windows with dual-mode transparencies, namely having two transparencies in (a) off-state and (b) above saturation voltage. The films opacity occurs at a cross-over voltage range. If the pitch of the cholesteric liquid crystal is in the visible range of the wavelength of light, the shutter is "colored-transparent" in off-state and "colorless-transparent" above the saturation voltage.

The flexible substrate to be used in the present invention may be a variety of substrates such as these known in the art, that is flexible substrates which have been provided with an electrode layer, preferably transparent, on a surface thereof. The flexible substrate is typically a transparent substrate having on its surface a transparent electrode layer. The other flexible substrate is also transparent and likewise carries a transparent electrode layer.

Some illustrative examples of the resins for the flexible substrates to be used in the present invention include polyesters such as polyethyleneterephthalate (PET), polybutyleneterephthalate, polycarbonates, polypropylene, polyether sulfones (PES), and polyamides. Among these, the preferred resins are polyethyleneterephthalate and polyether sulfones.

The electrode layer to be used may be a conventional one, and some illustrative examples of the electrode layer include tin oxide film called NESA film; indium oxide layer wherein tin oxide is mixed, the layer being called ITO film; and thin films of metals such as gold and titanium, which are thin films having good conductivity. Among these electrodes, particularly preferred for the transparent electrode layer is ITO film.

The two flexible substrates preferably have a form suitable for a continuous production process, such as a film or sheet; it is desirable to use such substrates in rolled state.

The transparent conductive film is typically formed by conventional prior art methods such as sputtering or by electron-beam vacuum deposition. Other methods such as ion-plating, coating and chemical vapor deposition are suitably adapted.

There is no particular restriction in the favor of substrates to be used in the present invention, and the forms of the substrate to be used may vary depending on the purpose of use, etc. Generally, substrates of plate-form, sheet-form or film form are preferably used in the present invention, and it is particularly preferable to use film form substrates to take advantage of their fitness to continuous production systems.

The thickness of the substrates may be selected according to the qualities of the substrates such as the degree of transparency, flexibility, strength, and processability, the end use of one device, etc., and it is generally from about 20 to about 1000 $\mu$m.

Referring now to the drawings, FIG. 1 shows a liquid crystal device wherein referral numerals 1 and 2 are flexible and transparent substrates having a transparent coating 3 and 4 of indium-tin oxide. Reference numerals 5 and 6 indicate the resin binder while reference numerals 7 and 8 indicate the microspacers which are included in the device. The polymer stabilized liquid crystal composition is shown by reference numerals 9 and 10.

Figure 2A:
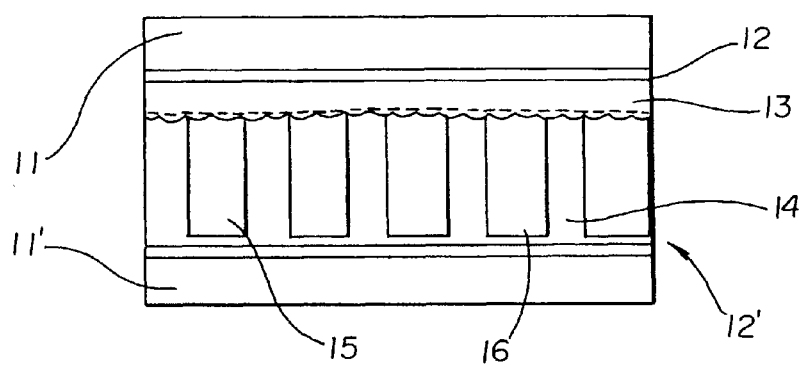
FIG. 2a is a cross-sectioned view showing a liquid crystalline device having a binder-fixed replicated structure.

FIG. 2a shows a cross-sectional view of a liquid crystalline device having a binder fixed replicated structure. Reference numerals 11 and 11' indicate the flexible plastic substrates having a transparent coating 12 and 12' of indium-tin oxide. Reference numerals 13 and 14 indicate the resin binders while reference numerals 15 and 16 show the polymer stabilized liquid crystal in the replicated microvessels.

Figure 2B:
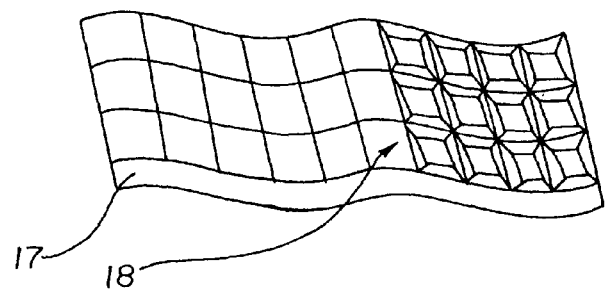
FIG. 2b is a side view showing a liquid crystalline device having a binder fixed replicated structure.

FIG. 2b is a side view showing a liquid crystalline device having a binder fixed replicated structure wherein reference numeral 17 designates a polyethylene terephthalate substrate and reference numeral 18 illustrates the binder microvessels wherein the polymer stabilized liquid crystal is entrapped.

Figure 3:
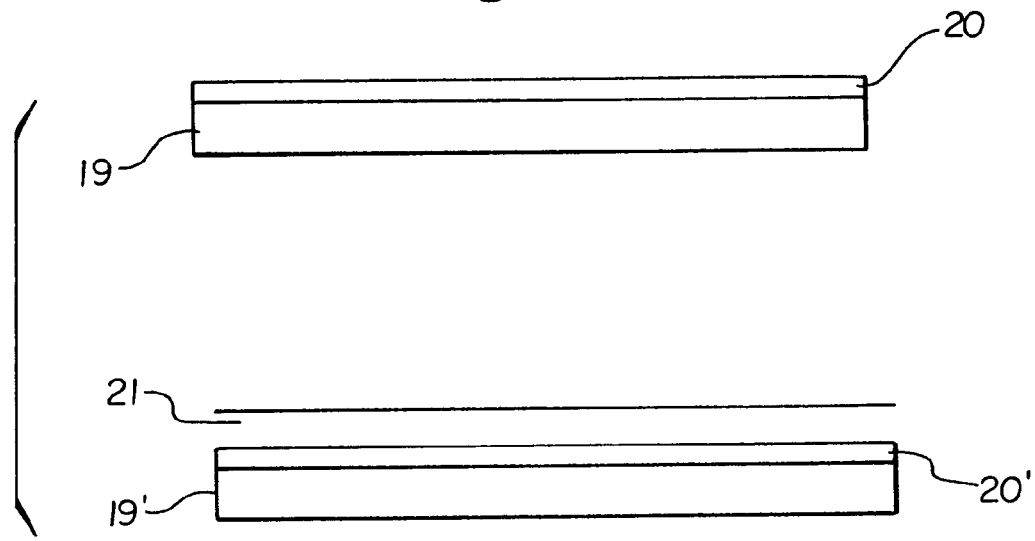
FIG. 3 illustrates the first step of the process of the present invention which is coating a binder on the flexible conductive substrate.

FIG. 3 illustrates the first step of the process of the present invention wherein a substrate 19 made of polyethylene terephthalate and having a transparent conductive coating 20 of indium-tin oxide is coated with a resin binder to give a product as shown wherein 19' is the polyethylene terephthalate substrate, 20' is the transparent conductive coating and 21 represent the resin binder.

Figure 4:
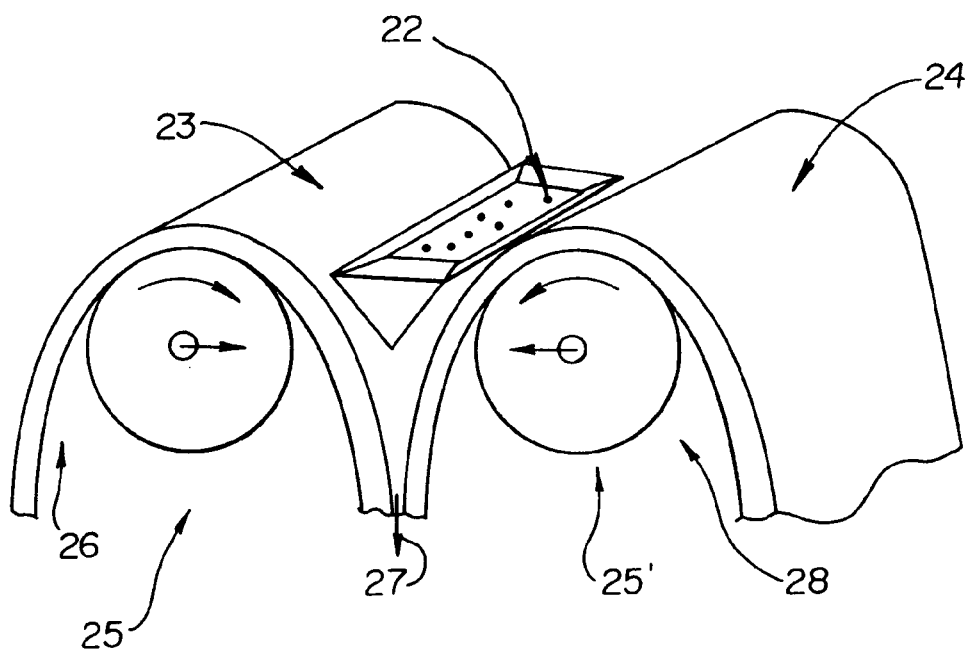
FIG. 4 shows the coating and lamination of the PSLC mixture containing microparticles between resin bonded flexible conductive substrates.

The lamination step of one of the processes of the invention is shown in FIG. 4. FIG. 4 illustrates the coating and lamination of the polymer stabilized liquid crystal mixture containing microparticles between resin bonded flexible conductive substrates. In FIG. 4, reference numeral 22 indicates a polymer stabilized liquid crystal (PSLC) composition containing micro-pearl spacers. The PSLC composition containing micro-pearl spacers and designated as reference numeral 22 is coated onto flexible conductive substrates 23 and 24 and subsequently laminated at a temperature greater than 80° C. by heated rails 25 and 25'. Reference numerals 26, 27 and 28 indicate the direction of movement of the lamination.

Figure 5A:
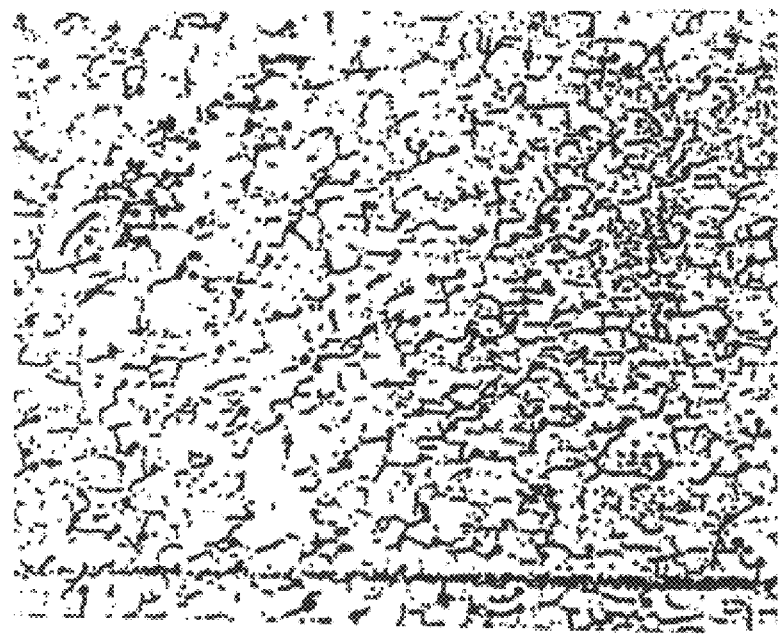
FIG. 5a illustrates a micrograph of PSLC on flexible films with a binder.
Figure 5B:
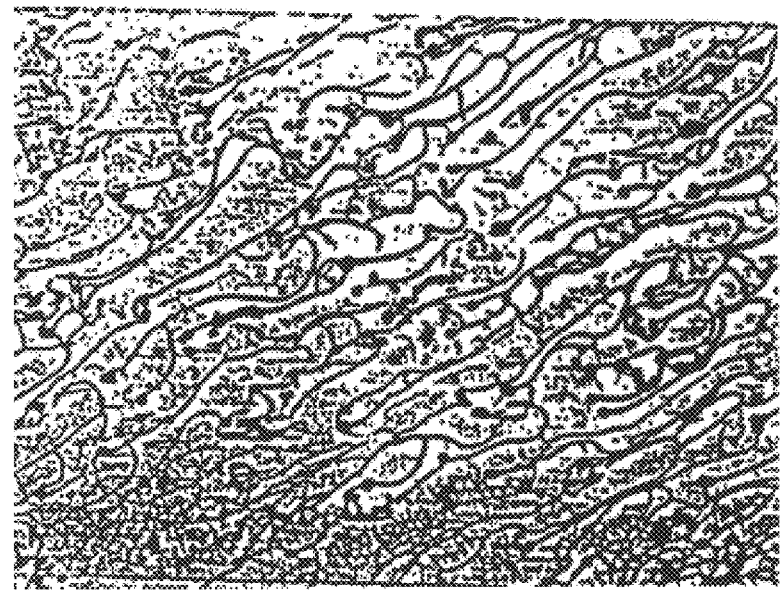
FIG. 5b shows a micrograph of PSLC on flexible films without binder.

FIGS. 5a and 5b illustrate micrographs of the laminates obtained by the process shown in FIG. 4. FIG. 5a shows a micrograph of a PSLC on flexible films with a binder while FIG. 5b shows a micrograph of a PSLC on flexible films without binder.

Figure 6A:
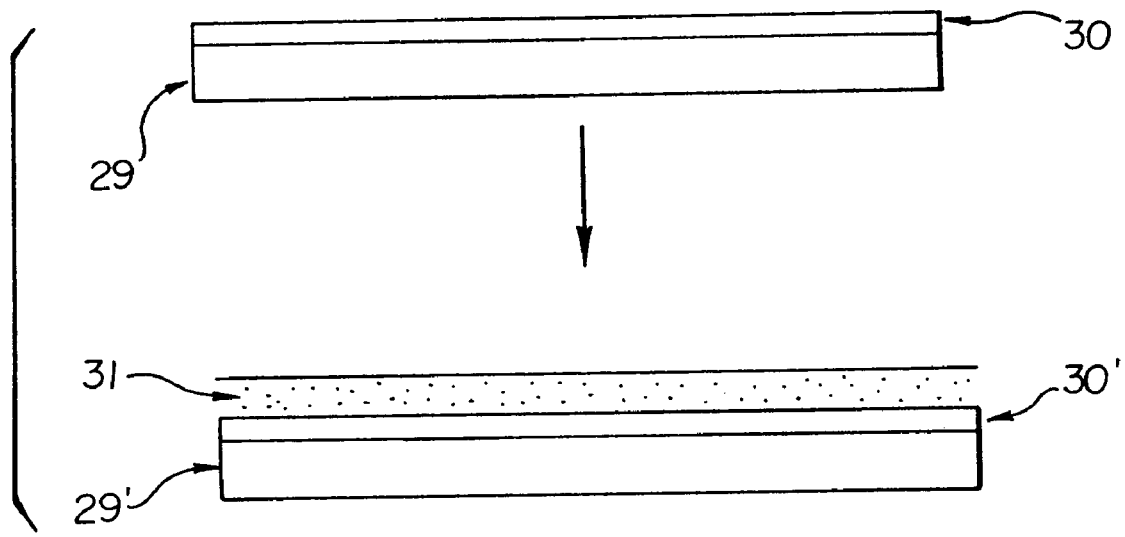
FIG. 6a illustrates the first step of the process relating to manufacture of flexible PSLC films having a replicated structure.
Figure 6B:
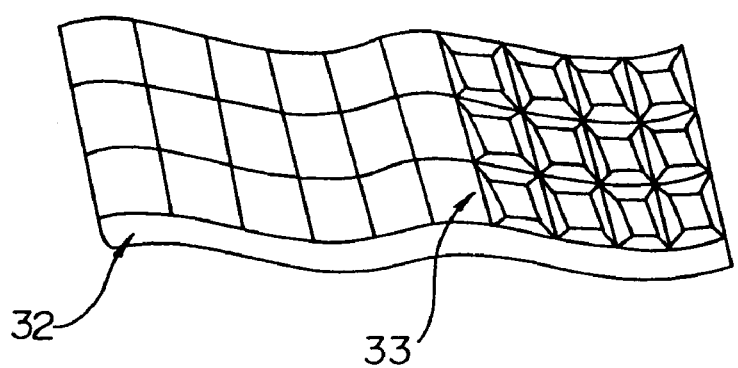
FIG. 6b shows a side view of a flexible conductive substrate having a replicated binder structure.

FIG. 6a illustrates the first step of the process relating to the manufacture of flexible PSLC films having a replicated structure. In the first step illustrated in FIG. 6a a flexible polymer substrate 29 having a transparent electrode layer 30 is coated with a resin binder to produce a flexible film having substrate 29', transparent electrode layer 30' and resin binder 31. In FIG. 6b a flexible conductive substrate 32 is shown having a replicated binder structure 33 made by screen printing.

Figure 7:
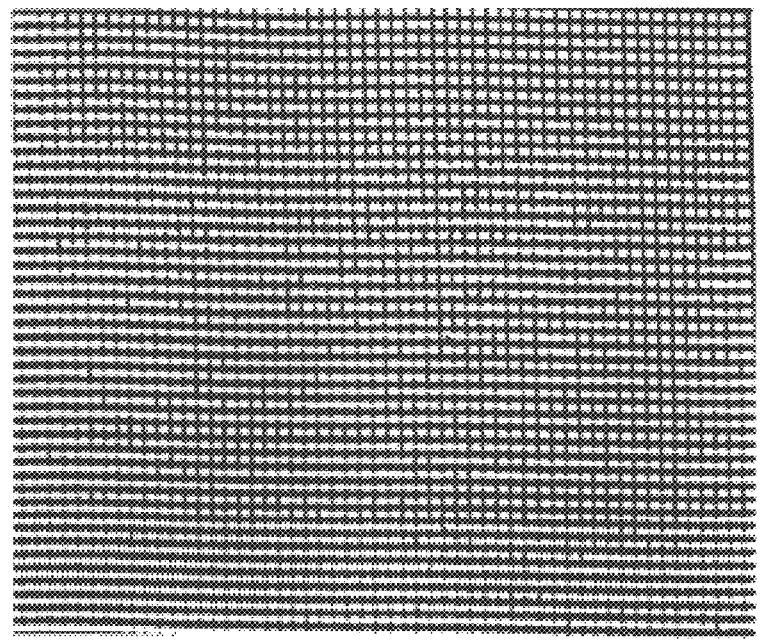
FIG. 7 shows masks chosen by computer and printed on transparent paper for photo incision of screen printing frames.
Figure 7:
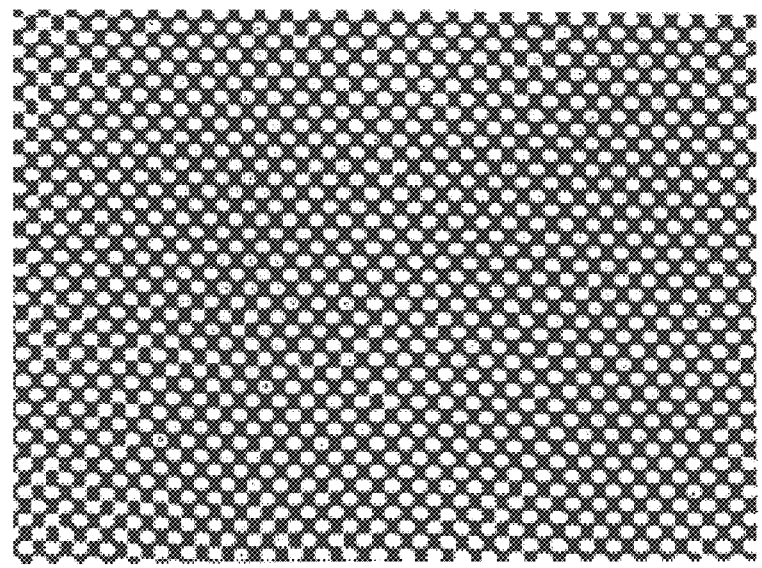

FIG. 7 shows the mask chosen by computer and printed on transparent paper for photo incision of screen printing frames.

Figure 8:
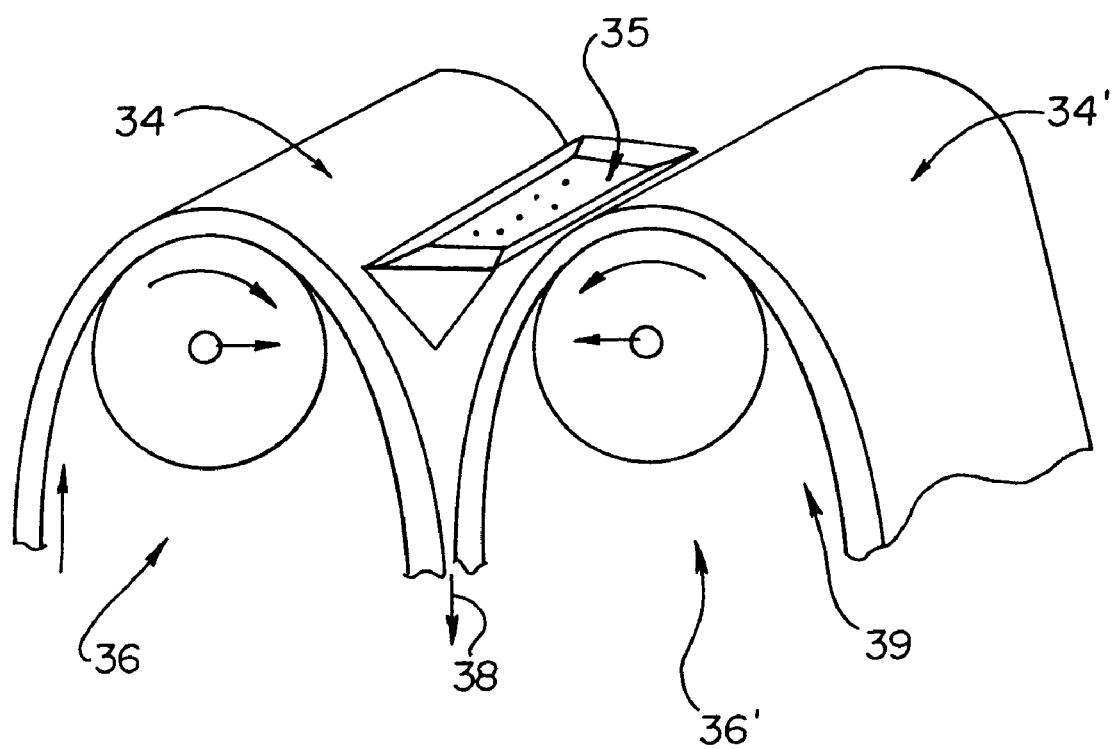
FIG. 8 illustrates the coating and lamination of the PSLC mixture between a flexible conductive substrate having the coating of a resin binder and another flexible conductive substrate having a printed pattern of a resin binder.

FIG. 8 illustrates the coating and lamination of the PSLC mixture between a flexible conductive substrate having a uniform coating of a resin binder and another flexible conductive substrate having a printed pattern of a resin binder. In FIG. 8, reference numeral 35 indicates a polymer stabilized liquid crystal (PSLC) composition. The PSLC composition and designated as reference numeral 35 is coated onto flexible conductive substrates 34 and 34' and the resulting assembly is laminated at a temperature greater than 80° C. by heated rolls 36 and 36'. Reference numerals 37, 38 and 39 indicate the direction of movement of the lamination process.

Figure 9A:
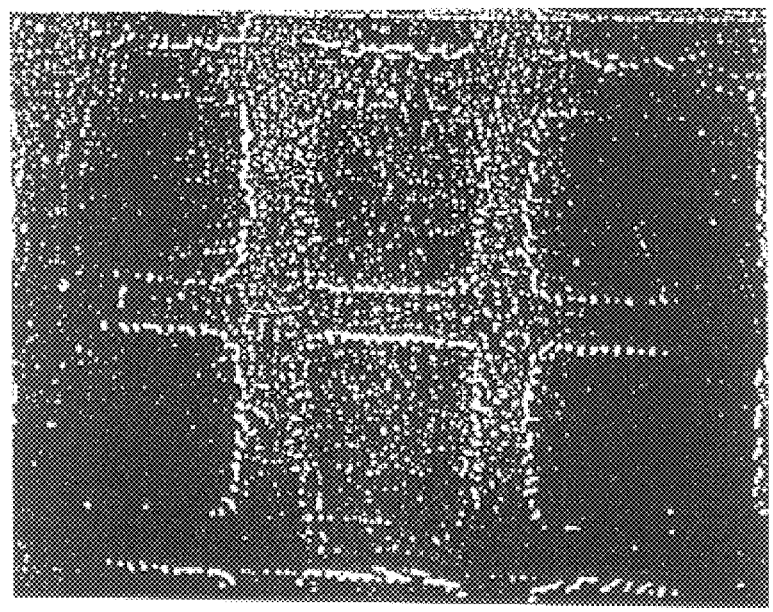
FIG. 9a shows the resin printed domains created on flexible conductive substrates without PSLC mixture.
Figure 9B:
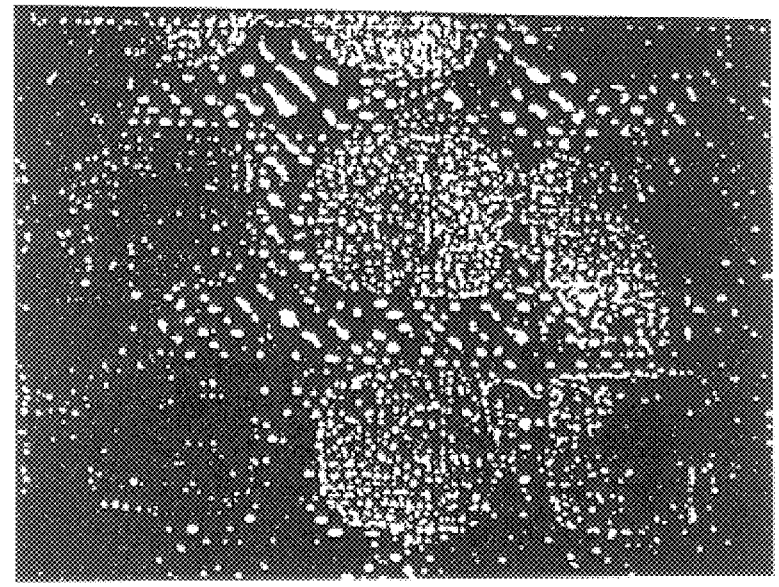
FIG. 9b illustrates the resin printed domain created on flexible conductive substrates with a PSLC mixture.

FIGS. 9a and 9b are micrographs which illustrate the resulting laminations of the process shown in FIG. 8. FIG. 9a shows the resin printed domains heated on flexible conductive substrates without a PSLC mixture. FIG. 9b illustrates the resin printed domains created on flexible conductive substrates with a PSLC mixture.

Figure 10A:
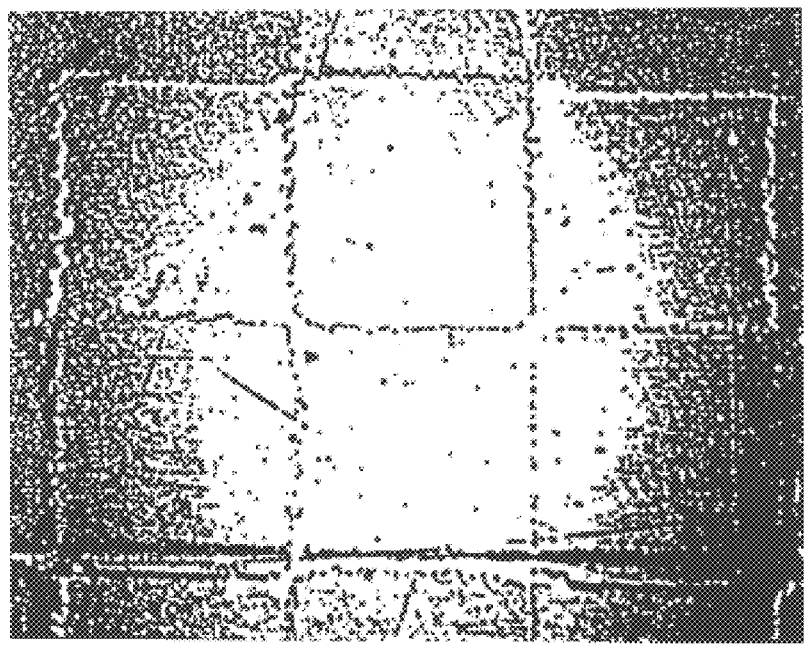
FIG. 10a shows the resin domains created on ITO-PET films without a PSLC.
Figure 10B:
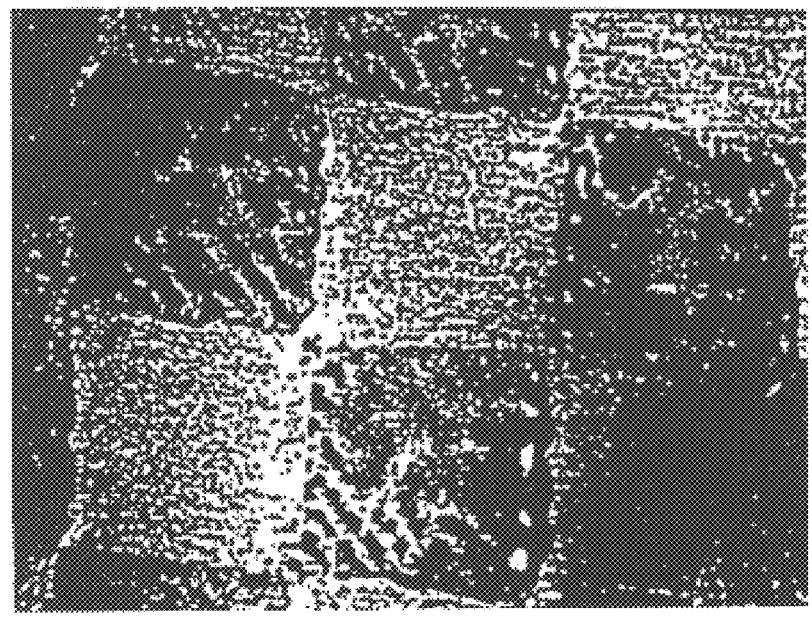
FIG. 10b discloses resin domains created on ITO-PET films with a PSLC mixture trapped.

FIG. 10a shows the resin domains created on ITO-PET films without a PSLC while FIG. 10b discloses resin domains created on ITO-PET films with a PSLC mixture trapped.

Figure 11A:
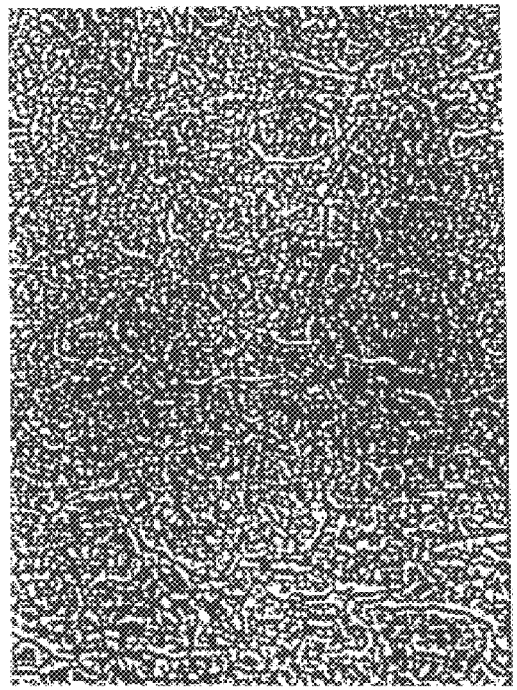
FIGS. 11a and 11b show the resulting micrographs of Example 9.
Figure 11B:
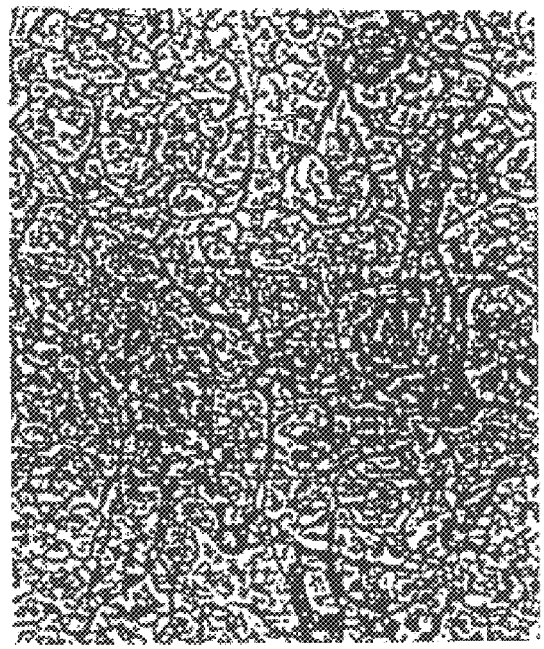

FIGS. 11a and 11b show the resulting micrographs of Example 9.

Figure 12:
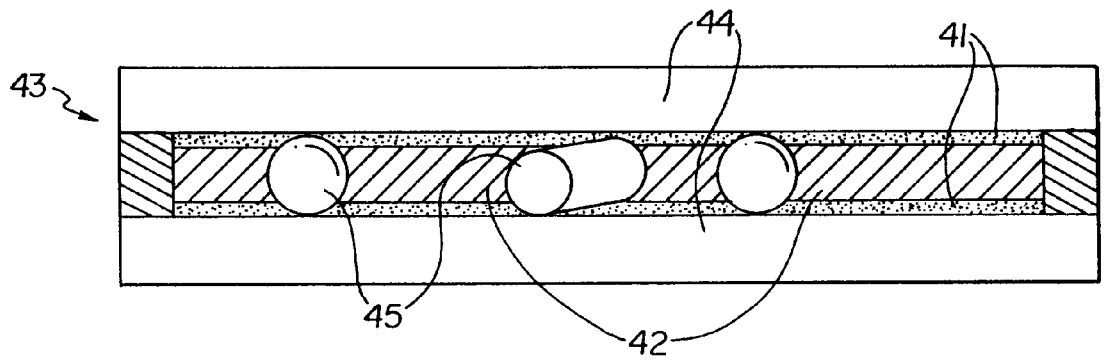
FIG. 12 shows a liquid crystalline device fabricated by the binder-fixed spacers method of the invention.

FIG. 12 shows a liquid crystalline device fabricated by the binder-fixed spacers method of the invention. ITO-PET film 44 is coated on the interior sides with adhesive coating 41 (binder). Liquid crystal or liquid crystal gel 42 is between the adhesive coated ITO-PET film layers and spacers 45, which may be microspheres or microrods, are disposed in the layers 42 and 41. Edge-sealing areas 43 are also present.

Figure 13:
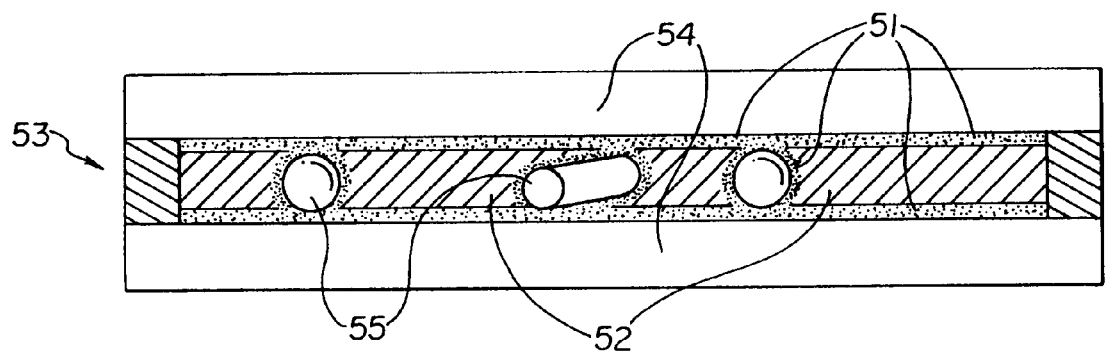
FIG. 13 shows a liquid crystalline device fabricated by the binder-fixed adhesive spacers method of the invention.

FIG. 13 shows a liquid crystalline device fabricated by the binder-fixed adhesive spacers method of the invention. ITO-PET film 54 is coated on the interior sides with adhesive coating 51 (binder). Liquid crystal or liquid crystal gel 52 is between the adhesive coated ITO-PET film layers and adhesive coated spacers 45, which may be microspheres or microrods, are disposed in the layers 42 and 41. Edge-sealing areas 43 are also present.

Figure 14:
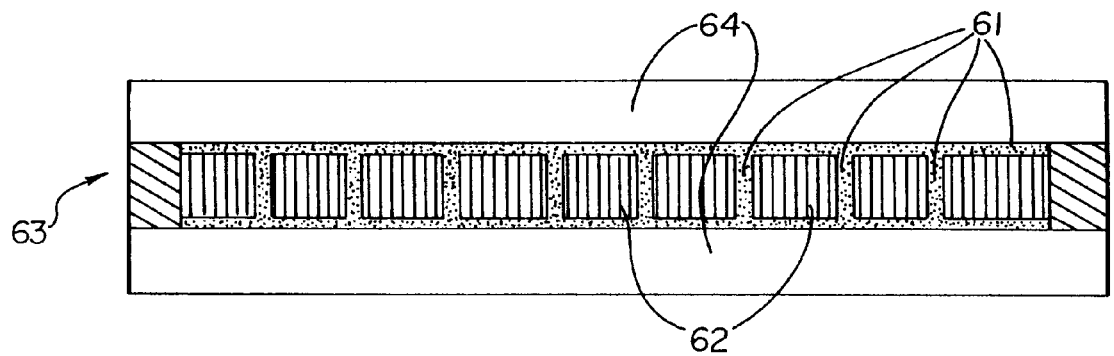
FIG. 14 shows a liquid crystalline device fabricated by the binder-fixed replicated structure method of the invention.

FIG. 14 shows a liquid crystalline device fabricated by the binder-fixed replicated structures method of the invention. ITO-PET film 64 is coated on the interior sides with adhesive coating 61 (binder). Liquid crystal or liquid crystal gel 62 is between the adhesive coated ITO-PET film layers. Edge-sealing areas 63 are also present.

Figure 15A:
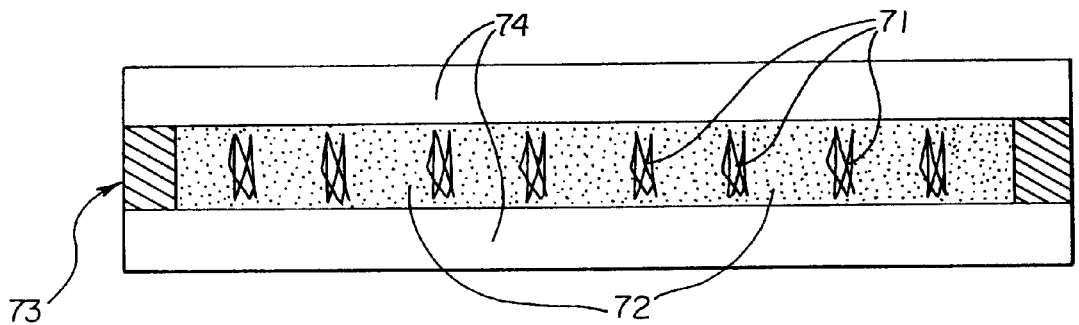
FIG. 15a shows a liquid crystalline device fabricated by the in-situ replicated fixed structure method of the invention.
Figure 15B:
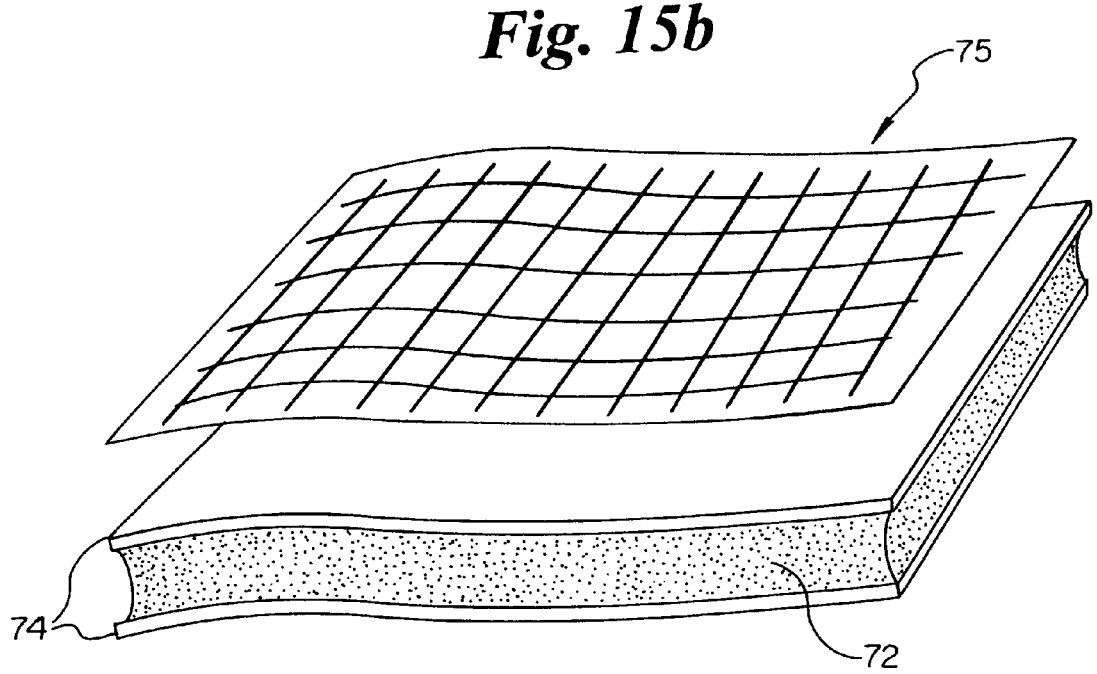

FIG. 15a shows a liquid crystalline device fabricated by the in-situ replicated fixed structure method of the invention. Liquid crystal or liquid crystal gel 72 is disposed between the ITO-PET film layers 74 and the liquid crystal or liquid crystal gel 72 contains ultraviolet radiation-cured polymer network zones 71. Edge-sealing areas 43 are also present. FIG. 15b shows the ultraviolet radiation mask 75 being placed over the film before ultraviolet curing to produce the device of FIG. 15a.

Figure 16A:
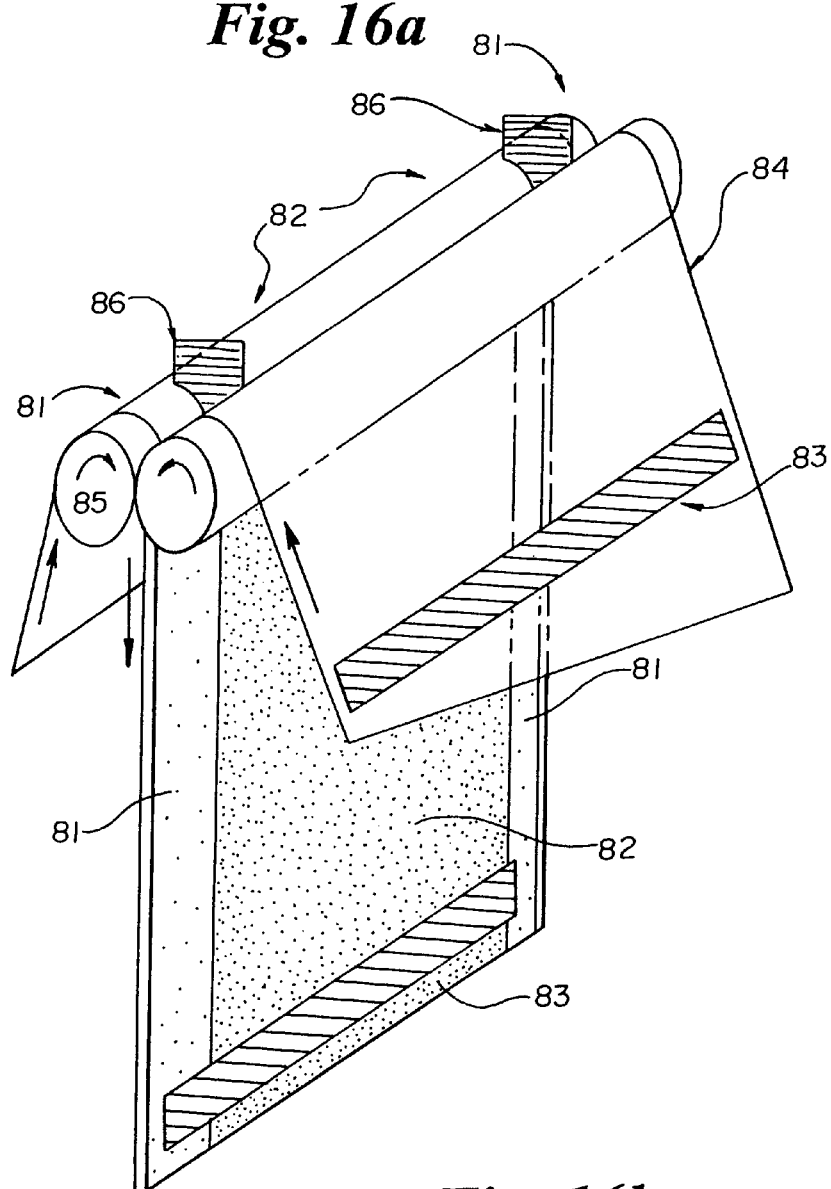
FIG. 16a shows a method of making a plastic liquid crystal or plastic liquid crystal gel device of the invention.

FIG. 16a shows the method of making a plastic liquid crystal or plastic liquid crystal gel device of the invention. ITO-PET films 84 are guided through heated rolls 85. Delimiters 86 separate adhesive resin 81 from liquid crystal or liquid crystal gel 82. The liquid crystal or liquid crystal gel includes spacers that may be microspheres or microrods. Double-sided adhesive tape 83 is used to seal sections of liquid crystal or liquid crystal gel. A useful double-sided adhesive tape is a copper foil tape, with a pressure sensitive adhesive filled with a silver grit, available from 3M Company. If a liquid crystal gel is used, the film may be subject to further heat and/or ultraviolet radiation cure.

Figure 16B:
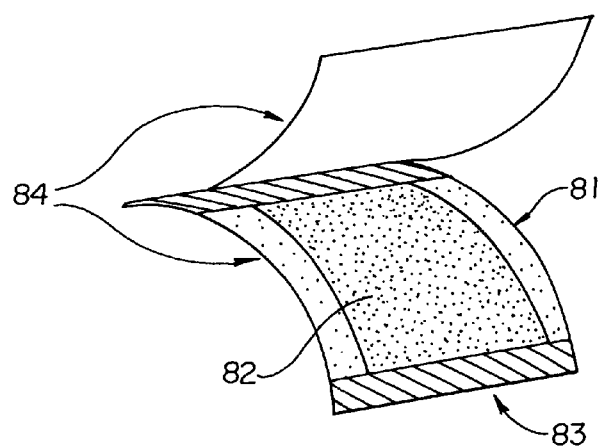

FIG. 16b shows another view of the film produced by the method shown in FIG. 16a.

FIGS. 17a, 17b, and 17c show a plastic liquid crystal film. This film contains no polymer. FIG. 17a shows the film at zero voltage in the planar texture. FIG. 17b shows the film at 30 volts in the homeotropic phase. FIG. 17c shows the film at zero volts in the focal conic phase.

FIGS. 18a, 18b, and 18c show a plastic liquid crystal gel film. FIG. 18a shows the film at zero voltage in the planar texture. FIG. 18b shows the film at 30 volts in the homeotropic phase. FIG. 18c shows the film at zero volts in the focal conic phase.

The present invention relates to processes for making flexible PSLC films and LC films. In the first process, called the binder-fixed spacers method, the PSLC solution (or LC only) with microspacers of 10 to 30 microns is placed between flexible conductive substrates film PET-ITO, previously coated with a 5 to 10 microns layer of resin (binder).

the film. One ITO-PET film (of the two) has strips of double-sided adhesive tape applied to it, normal to the direction of the process. The double-sided adhesive tapes close the surface where the PSLC mixture is confined. The prepolymer in the system is then cured with ultraviolet radiation or thermally.

In the devices obtained by the above manufacturing methods, the distance between the substrates which surround the polymer stabilized liquid crystal or liquid crystal only is approximately 5 to 30 microns.

MATERIALS & METHODS

1. Resins

Thermosets

DOMS (epoxy resin by University of Naples, Prof. Carfagna)

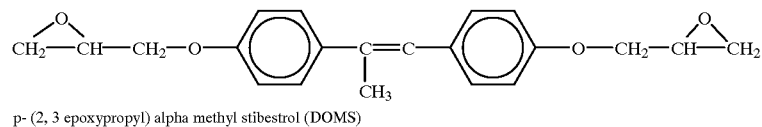

p- (2, 3 epoxypropyl) alpha methyl stibestrol (DOMS)

By coupling the binded substrates at high temperature (>80° C.) by roll to roll coating/laminating method, it is possible to fix the spacers between the PET-ITO films and to stabilize the gelly solution of PSLC or LC (see FIGS. 4 and 16).

In a modification of the first method, called binder-fixed adhesive spacers (BFAS), the same method is used, but the spacers themselves are coated with adhesive (see FIG. 13). The adhesive on the spacers binds with the adhesive on the ITO-PET films to form a more stable film.

In the second method of lamination, called the binder fixed replicated structure, a resin is coated in a regular replicated network structure by a screen printing or photo-etching technology on a flexible conductive substrate (PET-ITO). This technology allows the creation of areas (vessels) in which the PSLC (or LC) mixture can be trapped. The mixture is put between the substrate with the "replicated structure" and a common PET-ITO film. The resin binder couples and stabilizes the PSLC (or LC) mixture (see FIGS. 8 and 14).

In a variation of this method, called in-situ replicated network fixed structure (IRNFS), the PSLC mixture, with UV-curable prepolymer, is coated and laminated between two ITO-PET films. The system is then UV-cured in two steps. The first step is made using a mask over the sample (see FIGS. 15a and 15b). In this way, a polymer network is created where the UV radiation passes through, in the PSLC system. A second step of UV-processing is then made to stabilize the system and to cure the rest of the UV-curable prepolymer. This technology allows the creation of areas (vessels) in which the PSLC (or LC) mixture can be trapped.

In another method, called plastic liquid crystal or plastic liquid crystal gel, the PSLC solution (or LC only) with microspacers of 10 to 30 microns was put between flexible conductive substrate films of PET-ITO. During the coating/laminating process, a prepolymer (immiscible with the liquid crystal) is simultaneously injected at the edges of the PSLC mixture. This prepolymer serves to seal the edges of EPON 828 (epoxy resin by SHELL)

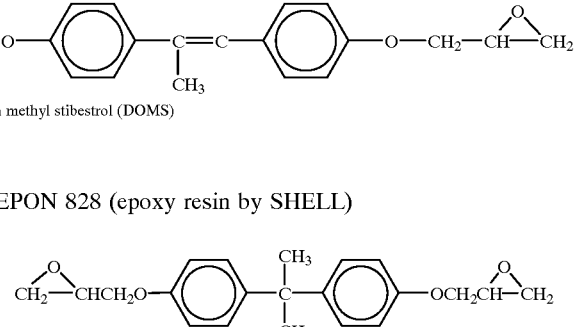

HELOXY (reactive diluent by INTERORGANA)

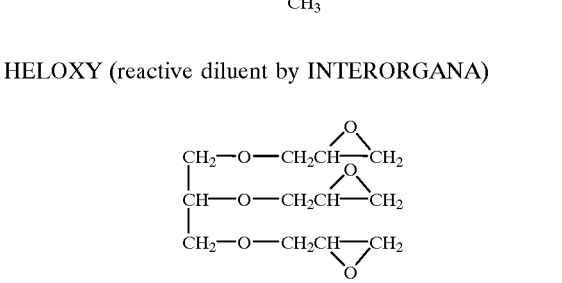

DAT (curing agent, by ALDRICH)

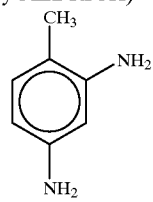

2-4 diamine toluene
CAPCURE 3-800 (curing agent by HENKEL)

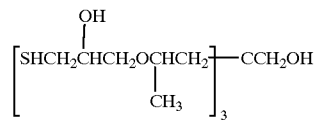

UV Curable
NOA 65 (UV resin, by NORLAND)
SAM 114 (UV resin, by MERCK)
MOM PdLC (mesogenic metal-organo compound, by Univ. of Naples, Prof. Sirigu)

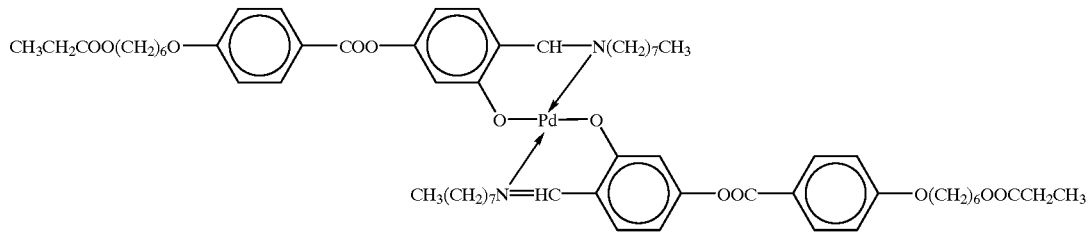

CN104 (UV resin, by CRAY VALLEY)
CN934 (UV resin, aliphatic urethane diacrylate, by CRODA RESINS)
CN947A60 (UV resin, aliphatic urethane acrylate, by CRODA RESINS)
CN970A60 (UV resin, aromatic urethane triacrylate, by CRODA RESINS)
CN945B85 (UV resin, aliphatic urethane triacrylate, by CRODA RESINS)
UVS-500 (UV resin, silicone acrylate oligomer, by CRODA RESINS)
Ebecryl Resin 284 (UV resin, aliphatic urethane diacrylate, by UCB CHEMICALS)
Ebecryl Resin 810 (UV resin, polyester tetraacrylate, by UCB CHEMICALS)
Photometer 6000 Series (UV resins, urethane acrylates by HENKEL, e.g., 6010, 6210, 6008)
Thermoplastics
PARALOID B/72 (hidroxy functional acrylic resin, by ROHM & HAAS)
PARALOID AU 608 (hidroxy functional acrylic resin, by ROHM & HAAS)
Joncryl 587 (acrylic oligomer, available from JOHNSON POLYMER)
QR 1033 (hidroxy functional acrylic resin, by BAYER)
N75 (Polyisocyanate, by BAYER)
2. Liquid Crystals
E43 (nematic mixture, by MERCK)
E7 (nematic mixture, by MERCK)
TN0623 (nematic mixture, by HOFFMANN LA ROCHE)
TN10427 (nematic mixture, by HOFFMANN LA ROCHE)
BL063 (nematic mixture, by MERCK)
3. Chiral Compounds
CB15 (pure chiral component, by MERCK)
Cholesteryl Acetate (chiral component, by ALDRICH)
4. Conductive Substrates
Flexible
PET+ITO* (by COURTAULDS d=0.175 mm) * ITO= Indium Tin Oxide
5. Spacers
micro-pearls (d=5–30 microns by DODWELL HI-TECH)

SOME METHODS FOR MAKING FLEXIBLE LIQUID CRYSTAL FILMS

Method I: Binder-Fixed Spacers (BFS)
Step by step description of film preparation:
1) Binder Application onto ITO-PET film. (FIG. 3)
A 2 to 10 micron thick UV-curable (NOA65, SAM114 . . . ) or thermoplastic (PARALOID b/72, AU1033 . . . ) or thermoset (EPON 828, DAT* . . . ) resin is coated on two pieces of ITO-PET films separately and then cured. This step puts a soft layer of resin-binder on the conductive surface of the ITO-PET films which are then utilized to prepare a polymer stabilized liquid crystal (PSLC) sandwich.

2) PSLC Mixture Preparation
The PSLC mixture consists of a homogeneous solution of 0<x<20% of UV-curable or thermoplastic or thermoset resin and 1-x % of LC*. The LC* is prepared mixing a 70<y<100% nematic LC (E43, E7, TN0623, . . . ) with a 1-y Chiral Material (CB15, Cholesteryl Acetate, . . . ). The low percentage of chiral material changes the LC from nematic to chiral nematic (cholesteric).

Mylar micro-pearl spacers (from 5 to 30 micron in diameter) are added to the PSLC mixture. Other types of spacers such as other types of microspheres, microrods, and fibers may be used; these spacers may be coated with adhesive before they are introduced into the mixture.

The whole mixture is mixed at a temperature of about 60 C. for about ten minutes. Alternatively, when using adhesive-coated spacers, the substrates may be sprayed with a solution of spacers, binder, and solvent. The solvent then be evaporated and then the liquid crystal or liquid crystal gel may be introduced, along with the other substrate.

3) Coating/Laminating of PSLC Mixture Between Resin Binded ITO-PET. (FIG. 4)
With a device like that shown in FIG. 4 the PSLC mixture with mylar micro-pearl spacers is simultaneously coated and laminated between two heated rolls which press one against to the other. The roll temperature is >80°.

A cross-section of this PSLC film sandwich is shown in FIG. 1. As shown, the partial immersion of the spacers in the binder layers and their fixture would result in creation of a large film with fixed spacers which can hold the fluid system. The micrographs in FIGS. 5a and 5b show a cholesteric fluid texture and the micro-pearl spacers in two films with (5a) and without (5b) resin binder. The sample without binder shows more defects on the liquid crystal texture because of very poor holding of the whole sample. Adhesive coated spacers may also be used in this method.

Method II: Binder Fixed Replicated Structure (BFRS)
Step by step description of film preparation:
1) Binder Coating Onto ITO-PET film. (FIG. 6a)
A 2–10 microns thick UV-curable (NOA65, SAM114 . . . ) or thermoplastic (PARALOID B/72, AU1033 . . . ) or thermoset (EPON 828, DAT* . . . ) resin is coated on one piece of ITO-PET film and then cured.

The same kind of resin utilized for the first piece of ITO-PET film is deposited on a second piece of ITO-PET film by screen printing or photo-etching technology in a regular replicated network structure. This procedure creates dominions (vessels) in which the PSLC mixture can be trapped. (FIG. 6b).

In order to obtain a replicated network of resin, a suitable mask is chosen by computer and printed on transparent paper (see FIG. 7). Then, by a photo-incision process, a screen printing frame is prepared. Finally the resin is deposited by this screen printing frame on the conductive surface of the ITO-PET film. The dimension of the vessels so obtained may change from 0.1 to 10 mm$^2$, preferably 1 to 10 mm². The two pieces of ITO-PET films so obtained are then utilized to prepare a PSLC sandwich.

2) PSLC Mixture Preparation

The PSLC mixture consists of a homogeneous solution of 0<x<20% of UV-curable or thermoplastic or thermoset resin and 1-x % of LC*. The LC* is prepared mixing a 70<y<100% nematic LC (E43, E7, TNO623, . . . ) with a 1-y Chiral Material (CB15, Cholesteryl Acetate, . . . ). The low percentage of chiral material changes the LC from nematic to chiral nematic (cholesteric). The whole mixture is mixed at a temperature of about 60° C. for about ten minutes.

3) Coating/Laminating of PSLC Mixture Between Resin Binded ITO-PET. (FIG. 8a)

With a device like that shown in FIG. 8a, the PSLC mixture is simultaneously coated and laminated between two heated rolls which press one against to the other. The roll temperature is >80°. A cross-section of this PSLC film sandwich is shown in FIG. 8b. The micrographs in FIGS. 9 and 10 show a piece of resin replicated structure on a ITO-PET film (a) and the cholesteric fluid texture trapped in structure of vessels obtained by the BFRS process.

In a variation of this method described above, the vessels may be formed by masking the PSLC mixture and exposing it to ultraviolet radiation

SPECIFIC EXAMPLES

BFS Method

Example 1

Binder: NOA65. E/O fluid material: E43/
Cholesteryl Acetate (CA)=75/25%

A LC* (*=chiral nematic) system was prepared by mixing 75% of a nematic liquid crystal (E43) and 25% of a chiral component (Cholesteryl acetate). Micro-pearls spacers SP215 were added (10 milligrams for gram of LC*). The prepolymer (NOA65) was coated as a layer of about 5 mm on two ITO-PET films and then UV-cured under a 20 mW/cm² UV-lamp.

The solution was then put between the conductive flexible binded substrates (binded ITO-PET) using a coater-laminator instrument. The electrooptical properties were measured. The results, reported below, indicate that the system shows the dual-modality behavior.

| Sample | Toff (%) | Ton (%) | T* (%) | $V_{90}$ (Volts) | V* (Volts) |
|--------|----------|---------|--------|------------------|------------|
| BFS1   | 14       | 95.2    | 80     | 115              | 32         |

Example 2

Binder: NOA65. E/O fluid material: E43/CA/
PdLC=80/10/10%

A PSLC system was prepared by mixing 80% of a nematic liquid crystal (E43), 10% of a chiral component (Cholesteryl acetate), and 10% of PDLC (mesogen metal-organo UV-curable compound). Micro-pearl spacers SP215 were added (10 milligrams for gram of LC*). The prepolymer (NOA65) was coated as a layer of about 5 mm on two ITO-PET films and then UV-cured under a 20 mW/cm² UV-lamp.

The solution was then put between the conductive flexible binded substrates (binded ITO-PET) using a coater-laminator instrument. The electrooptical properties were measured. The results, reported below, indicate that the system shows the dual-modality behavior.

| Sample | Toff (%) | Ton (%) | T* (%) | $V_{90}$ (Volts) | V* (Volts) |
|--------|----------|---------|--------|------------------|------------|
| BFS2   | 12       | 52.3    | 4      | 118              | 32         |

Example 3

Binder: SAM114. E/O fluid material: E43/CA/
SAM114=72/8/20%

A PSLC system was prepared by mixing 72% of a nematic liquid crystal (E43), 8% of a chiral component (Cholesteryl acetate), and 20% of SAM114 (UV-curable resin). Micro-pearl spacers SP215 were added (10 milligrams for gram of LC*). The prepolymer (SAM114) was coated as a layer of about 5 mm on two ITO-PET films and then UV-cured under a 20 mW/cm² UV-lamp.

The solution was then put between the conductive flexible binded substrates (binded ITO-PET) using a coater-laminator instrument. The electrooptical properties were measured. The results, reported below, indicate that the system shows the dual-modality behavior.

| Sample | Toff (%) | Ton (%) | T* (%) | $V_{90}$ (Volts) | V* (Volts) |
|--------|----------|---------|--------|------------------|------------|
| BFS3   | 35       | 96.7    | 20     | 57               | 16         |

Example 4

Binder: SAM114. E/O fluid material: E43/CA/
SAM114=76.5/8.5/15%

A PSLC system was prepared by mixing 76.5% of a nematic liquid crystal (E43), 8.5% of a chiral component (Cholesteryl acetate), and 15% of SAM114 (UV-Curable resin). Micro-pearl spacers SP215 were added (10 milligrams for gram of LC*). The prepolymer (SAM114) was coated as a layer of about 5 mm on two ITO-PET films and then UV-cured under a 20 mW/cm² UV-lamp.

The solution was then put between the conductive flexible binded substrates (binded ITO-PET) using a coater-laminator instrument. The electrooptical properties were measured. The results, reported below, indicate that the system shows the dual-modality behavior.

| Sample | Toff (%) | Ton (%) | T* (%) | $V_{90}$ (Volts) | V* (Volts) |
|--------|----------|---------|--------|------------------|------------|
| BFS4   | 39       | 86.7    | 20     | 48               | 16         |

Example 5

Binder: PARALOID. E/O fluid material: E43/CA/
PARALOID=70/10/20%

A PSLC system was prepared by mixing 70% of a nematic liquid crystal (E43), 10% of a chiral component (Cholesteryl acetate), and 20% of PARALOID B/72 (thermoplastic polymer). Micro-pearl spacers SP215 were added (10 milligrams for gram of LC*). The polymer (PARALOID B/72)

dissolved in toluene was coated as a layer of about 5 mm on two ITO-PET films and then heated in an oven at 60 C.

The PSLC solution was then put between the conductive flexible binded substrates (binded ITO-PET) using a coater-laminator instrument. The electrooptical properties were measured. The results, reported below, indicate that the system shows the dual-modality behavior.

| Sample | Toff (%) | Ton (%) | T* (%) | $V_{90}$ (Volts) | V* (Volts) |
|---|---|---|---|---|---|
| BFS5 | 39 | 96.4 | 2 | 106 | 40 |

Example 6

Binder: PARALOID. E/O fluid material: E43/CA/PARALOID=85.5/9.5/5%

A PSLC system was prepared by mixing 85.5% of a nematic liquid crystal (E43), 9% of a chiral component (Cholesteryl acetate), and 5% of PARALOID B/72 (thermoplastic polymer). Micro-pearl spacers SP215 were added (10 milligrams for gram of LC*). The polymer (PARALOID B/72) dissolved in toluene was coated as a layer of about 5 mm on two ITO-PET films and then heated in an oven at 60 C.

The PSLC solution was then put between the conductive flexible binded substrates (binded ITO-PET) using a coater-laminator instrument. The electrooptical properties were measured. The results, reported below, indicate that the system shows the dual-modality behavior.

| Sample | Toff (%) | Ton (%) | T* (%) | $V_{90}$ (Volts) | V* (Volts) |
|---|---|---|---|---|---|
| BFS6 | 89 | 99.2 | 2 | 55 | 25 |

Example 7

Binder: NOA65. E/O fluid material: E43/CA/CN104=85/10/5%

A PSLC system was prepared by mixing 85% of a nematic liquid crystal (E43), 10% of a chiral component (Cholesteryl acetate), and 5% of CN104 (UV-curable epoxy resin). Micro-pearl spacers SP215 were added (10 milligrams for gram of LC*). The prepolymer (NOA65) was coated as a layer of about 5 mm on two ITO-PET films and then UV-cured under a 20 mW/cm² UV-lamp.

The PSLC solution was then put between the conductive flexible binded substrates (binded ITO-PET) using a coater-laminator instrument. The electrooptical properties were measured. The results, reported below, indicate that the system shows the normal modality behavior.

| Sample | Toff (%) | Ton (%) | $V_{90}$ (Volts) |
|---|---|---|---|
| BFS7 | 3 | 90.3 | 81 |

BFRS Method

Example 8

Binder: PARALOID B/72. E/O fluid material: TNO623/CA=90/10%

A PSLC system was prepared by mixing 90% of a nematic liquid crystal (TNO623) and 10% of a chiral component (Cholesteryl acetate). Micro-pearl spacers SP215 were added (10 milligrams for gram of LC*).

The polymer PARALOID B/72 (thermoplastic polymer), dissolved in toluene, was coated as a layer of about 5 mm on two ITO-PET films and then heated in an oven at 60 C.

The PSLC solution was then put between the conductive flexible binded substrates (binded ITO-PET) using a coater-laminator instrument. The electrooptical properties were measured. The results, reported below, indicate that the system shows the normal-mode behavior.

| Sample | Toff (%) | Ton (%) | $V_{90}$ (Volts) |
|---|---|---|---|
| BFS8 | 12.7 | 83.8 | 108 |

PREPARATION OF POLYMER STABILIZED LIQUID CRYSTALS

Example 9

Effect on Structure

Some gel systems were prepared by mixing a liquid crystal epoxy resin (DOMS) with a suitable curing agent (DAT) at a percentage that gives a liquid crystalline polymer (DOMS/DAT=5/1) and a cholesteric liquid crystal obtained by mixing 5% of a pure chiral component (CB15) with a nematic liquid crystal (E43).

Three samples were prepared by mixing different percentages of resin and liquid crystal:

| | | |
|---|---|---|
| GEL 90% | 90% LC (E43 + CB15) | 10% resin (DOMS/DAT) |
| GEL 85% | 85% LC (E43 + CB15) | 15% resin (DOMS/DAT) |
| GEL 80% | 80% LC (E43 + CB15) | 20% resin (DOMS/DAT) |

The samples were prepared by mixing the components at a temperature of about 90 C. and putting the solution between conductive substrates at a thickness of 10 µm and curing in an oven at a temperature of 130 C. for about three hours.

The samples were observed with an optical microscope (Leitz Laborlux) between crossed polarizers. The structures were compared with those of the cholesteric liquid crystal film (LCf) containing only liquid crystal. We have reported here the micrographs obtained with liquid crystal film (LCf) and GEL 90%.

FIGS. 11a and 11b show the resulting micrographs illustrating the different structures of LCf and the gel system.

Example 10

Effect on the Angular Transmittance (Haze)

The ON-state transmittance of the samples of Example 9 were measured by a photometric system at different angle of view. Reported in the table below are the results of these measurements.

As can be seen from the tables, the transmittance decreases as the resin content in the gel system increases. This effect is due to the index mismatching between the resin and the liquid crystal that becomes remarkable at higher concentrations of resin (>20%).

However, the important result is that the resin concentration has no effect on the reduction of transmittance by increasing the angle of view (haze). In fact, as is shown in the tables below, all the samples are haze-free.

| Samples | Ton (0°) | Ton (15°) | Ton (30°) | Ton (45°) | Ton (60°) |
|---|---|---|---|---|---|
| LCf | 96.5 | 95.1 | 94.5 | 90.9 | 89.5 |
| GEL 90% | 95 | 93.7 | 92.3 | 87.7 | 83.7 |
| GEL 85% | 91.9 | 92.6 | 90.5 | 90.6 | 89.6 |
| GEL 80% | 44 | 44.1 | 43.9 | 41.2 | 41.4 |

Example 11
Effect on the Electro-Optical Properties

The electrooptical properties of the samples of Example 9 were measured with a photometric system. The results are reported in the table below.

| Samples | Toff (%) | Ton (%) | Tmin (%) | $V_{90}$ (Volts) | Vmin (Volts) |
|---|---|---|---|---|---|
| LCf | 82.45 | 96.5 | 8 | 22 | 15 |
| GEL 90% | 84.4 | 95 | 4 | 24 | 16 |
| GEL 85% | 51.93 | 91.9 | 6 | 34 | 16 |
| GEL 80% | 14.17 | 44 | 3 | 52 | 10 |

Toff is the percentage of transmittance in the field-OFF state.
Ton is the percentage of transmittance in the field-ON state.
Tmin is the lower percentage of transmittance.
$V_{90}$ is the voltage corresponding to 90% of transmittance.
Vmin is the voltage corresponding to lower transmittance.

Example 12
Effect on the Electrical Properties

The electrical properties (resistance) of the samples of Example 9 were measured by using a LCR-meter (HP 4284 A). The values obtained were normalized compared to samples thickness and area. The results have been reported in the table below. As it can be seen from the table, the resistivity of the film containing 20% of the resin is very high compared to other films.

| Samples | $\rho$(MΩ · m) |
|---|---|
| LCf | 24 |
| GEL 90% | 18 |
| GEL 85% | 19 |
| GEL 80% | 52 |

Example 13

A gel system was prepared by mixing 85% of the cholesteric mixture of Example 1 and 15% of a metalloorgano mesogen (MOM) UV-curable resin indicated as PDLC. The solution was mixed at a temperature of about 50 C. cured with UV radiation (I=10 mW/cm$^2$). The electrooptical properties of the sample were then measured with a photometric system.

The sample, in the OFF state, appears opaque. In the field-ON state, the material becomes transparent and remains in this state when the field is turned-OFF. In this situation, the film shows the dual-modality properties.

The above description and accompanying drawings are provided for the purpose of describing embodiments of the invention and are not intended to limit the scope of the invention in any way. It will be apparent to those skilled in the art that various modifications and variations can be made in the invention without departing from the spirit or scope of the invention. Thus, it is intended that the present invention cover the modifications and variations of this invention provided they come within the scope of the appended claims and their equivalents.

What is claimed is:

1. A method of making a flexible electrooptical liquid crystal device comprising:

(a) placing a fluid liquid crystal composition comprising liquid crystal, a prepolymer, and microparticles between flexible conductive substrates;

(b) laminating the substrates together; and (c) curing the fluid liquid crystal composition comprising the prepolymer to form a polymer stabilized liquid crystal, wherein the fluid liquid crystal composition prior to curing comprises 5 to 30 weight percent of the prepolymer.

2. The method of claim 1, wherein the microparticles have a particle size of from 5 to 50 microns.

3. The method of claim 1, wherein the curing of step (c) is by ultraviolet radiation or heat treatment.

4. The method of claim 1, wherein the microparticles are coated with adhesive.

5. The method of claim 1, wherein at least one of the flexible conductive substrates comprises a double-sided adhesive tape.

6. The method of claim 1, wherein the prepolymer comprises a UV curable compound selected from

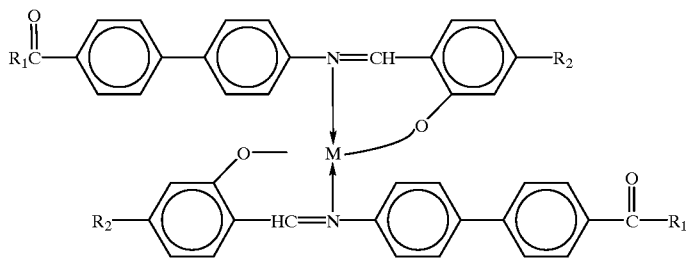

-continued
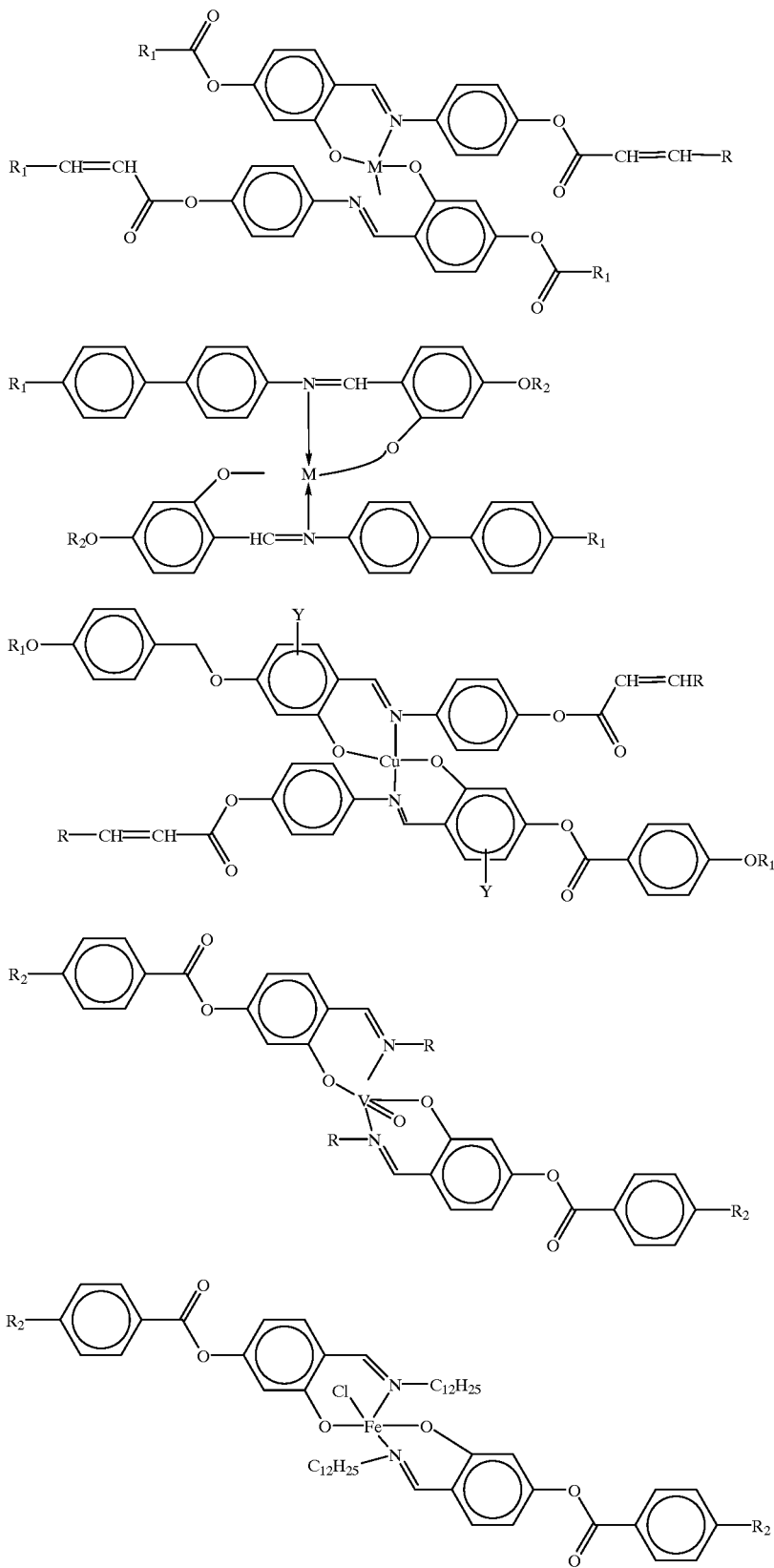

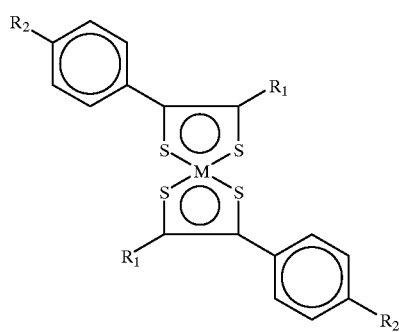
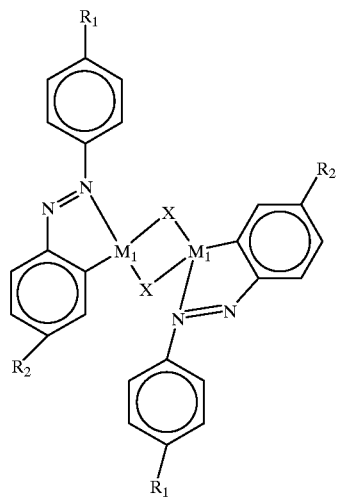
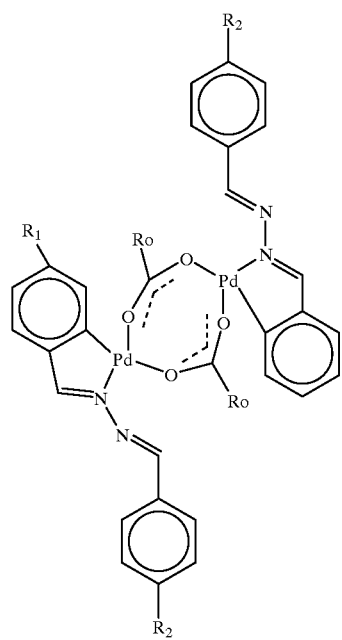

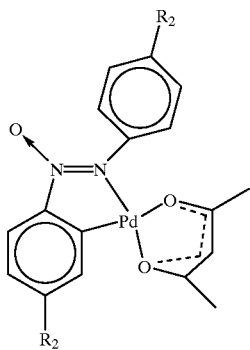

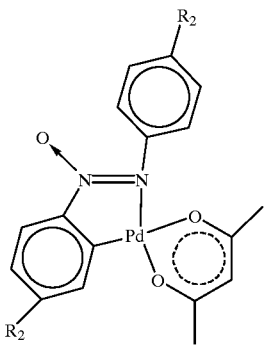

wherein M and $M_1$ is selected from Pt, Pd, Co, Au, or V; R is selected from $C_1$–$C_{10}$ branched or unbranched alkyl groups; Y is halogen; X is selected from $C_1$–$C_4$ alkyl;

Ro is

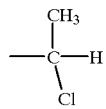

or $OC_mH_{2m+1}$, where m is 1 through 20; $R_1$ is selected from

—$(CH_2)_7CH_3$;

—$(CH_2)_3OCH_2CH_3$ and $R_2$ is $CH_2$=$CHCOO(CH_2)_6O$—.

7. A method of making a flexible electrooptical liquid crystal device comprising:

(a) placing a fluid liquid crystal composition comprising liquid crystal, a prepolymer, and microparticles between flexible conductive substrates;

(b) laminating the substrates together; and (c) curing the fluid liquid crystal composition comprising the prepolymer to form a polymer stabilized liquid crystal, wherein the prepolymer is mesogenic.

8. The method of claim 7, wherein the microparticles have a particle size of from 5 to 50 microns.

9. The method of claim 7, wherein the curing of step (c) is by ultraviolet radiation or heat treatment.

10. The method of claim 7, wherein the microparticles are coated with adhesive.

11. The method of claim 7, wherein at least one of the flexible conductive substrates comprises a double-sided adhesive tape.

12. The method of claim 7, wherein the prepolymer comprises a UV curable compound selected from

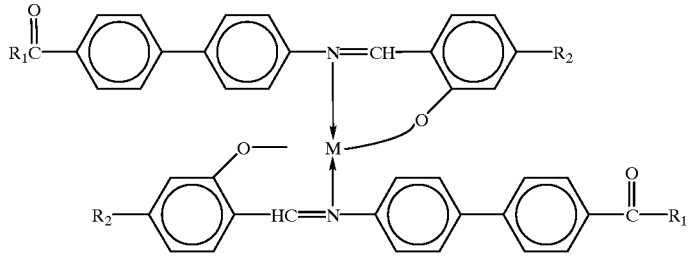

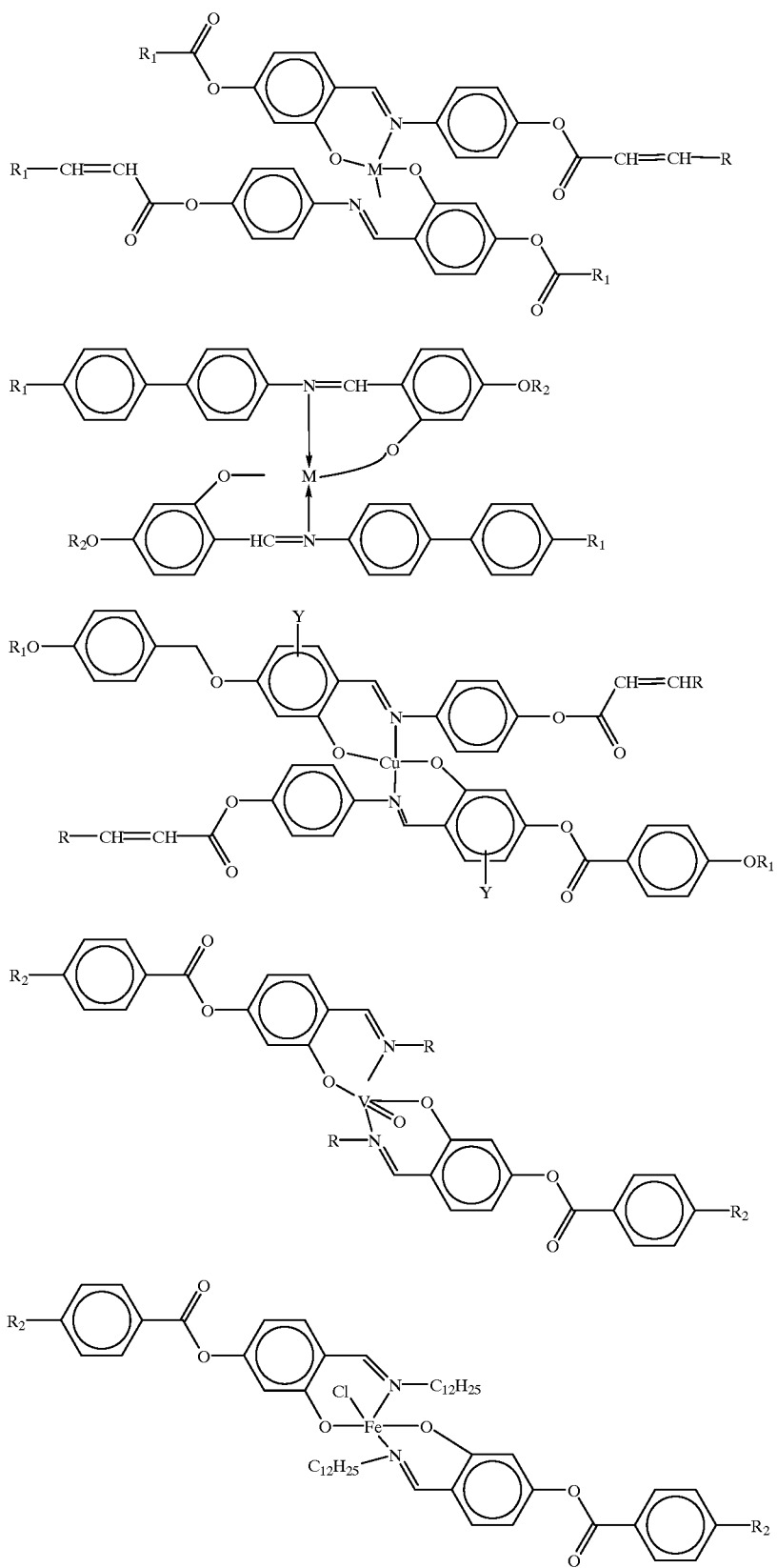

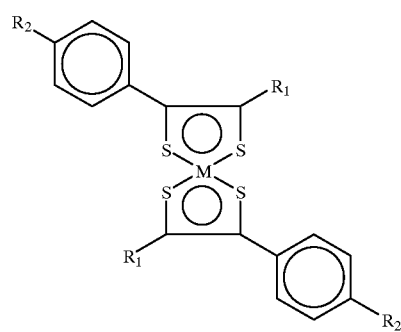
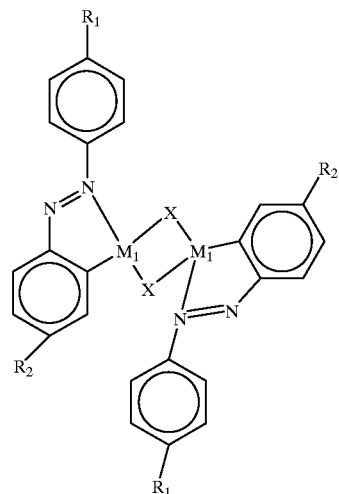
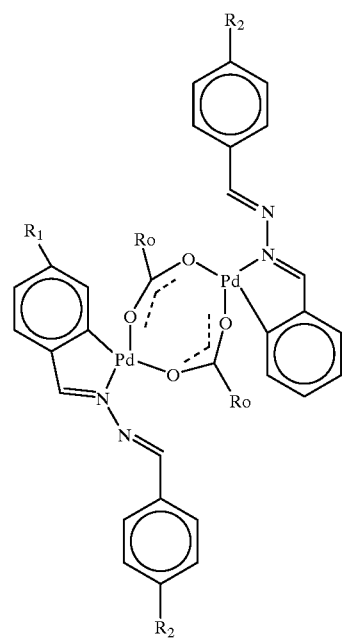

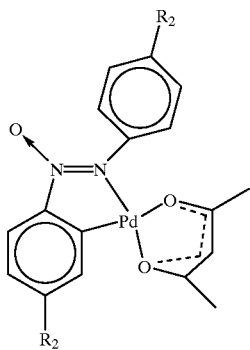

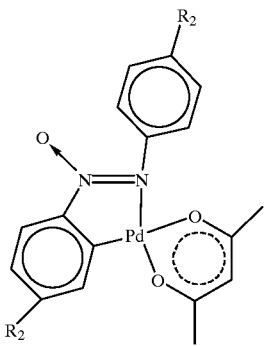

wherein M and $M_1$ is selected from Pt, Pd, Co, Au, or V; R is selected from $C_1$–$C_{10}$ branched or unbranched alkyl groups; Y is halogen; X is selected from $C_1$–$C_4$ alkyl;

Ro is $$-\underset{Cl}{\overset{CH_3}{\underset{|}{\overset{|}{C}}}}-H$$

or $OC_mH_{2m+1}$, where m is 1 through 20; $R_1$ is selected from

—$(CH_2)_7CH_3$;

—$(CH_2)_3OCH_2CH_3$ and $R_2$ is $CH_2$=$CHCOO(CH_2)_6O$—.

13. A method of making a flexible electrooptical liquid crystal device comprising:
(a) placing a fluid liquid crystal composition comprising liquid crystal, a prepolymer, and microparticles between flexible conductive substrates;
(b) laminating the substrates together; and
(c) curing the fluid liquid crystal composition comprising the prepolymer to form a polymer stabilized liquid crystal,
wherein the flexible conductive substrates comprise an adhesive layer.

14. The method of claim 13, wherein the microparticles have a particle size of from 5 to 50 microns.

15. The method of claim 13, wherein the curing of step (c) is by ultraviolet radiation or heat treatment.

16. The method of claim 15, wherein the microparticles are coated with adhesive.

17. The method of claim 13, wherein at least one of the flexible conductive substrates comprises a double-sided adhesive tape.

18. The method of claim 13, wherein the prepolymer comprises a UV curable compound selected from

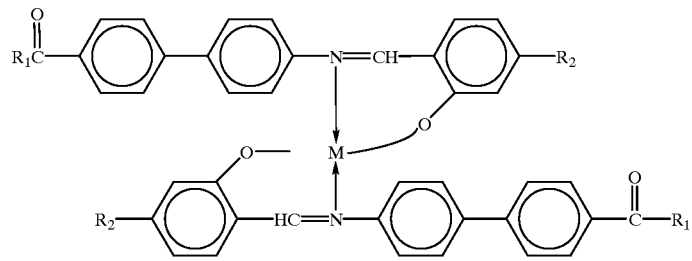

-continued
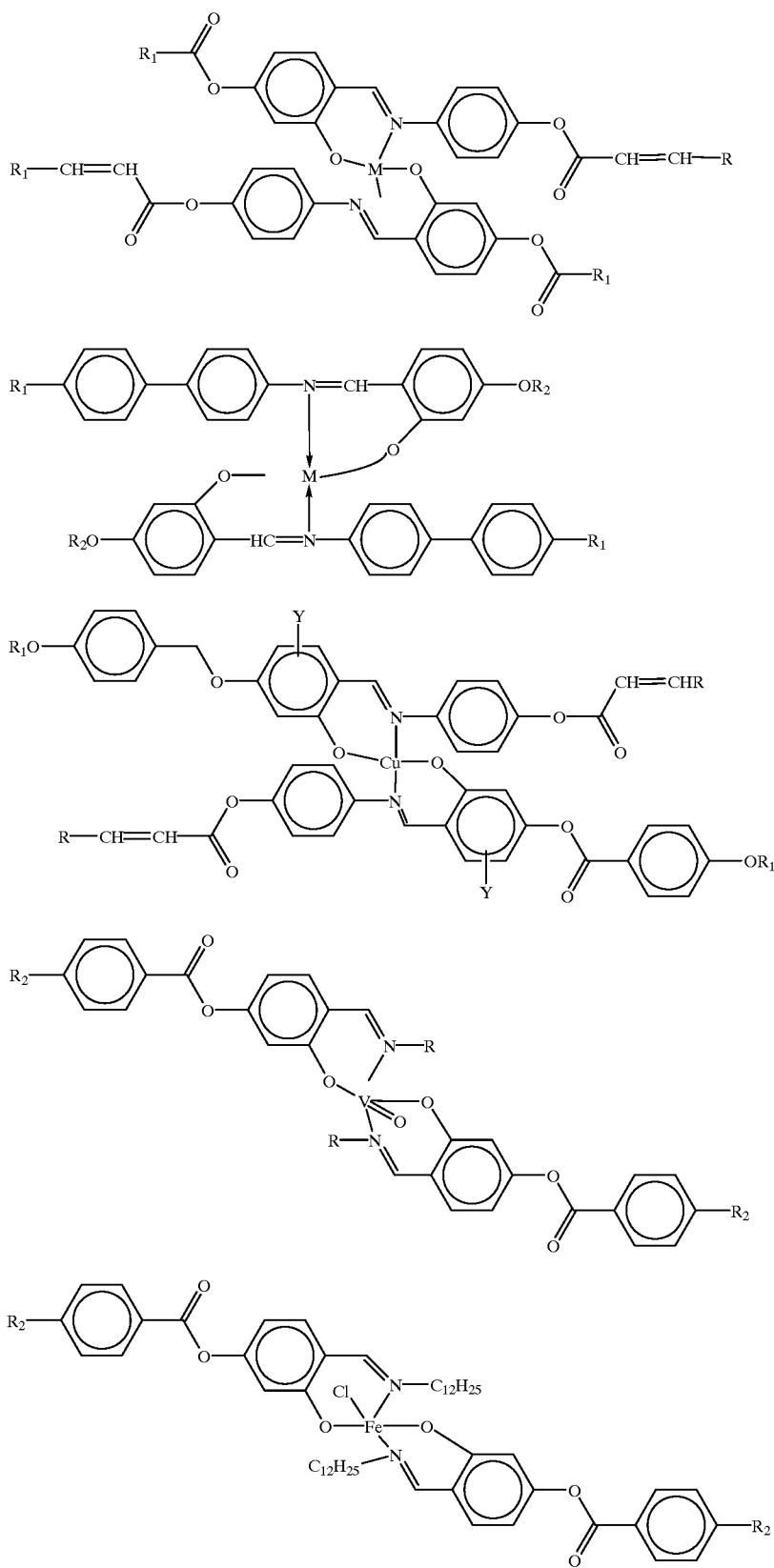

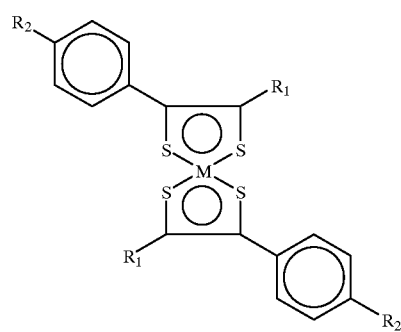
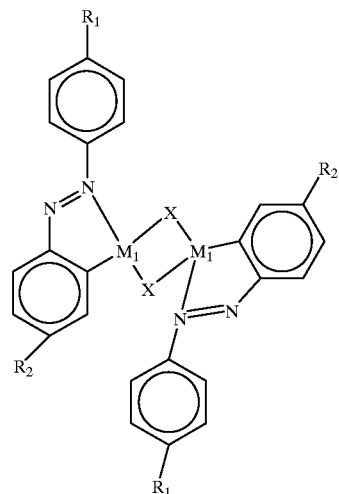
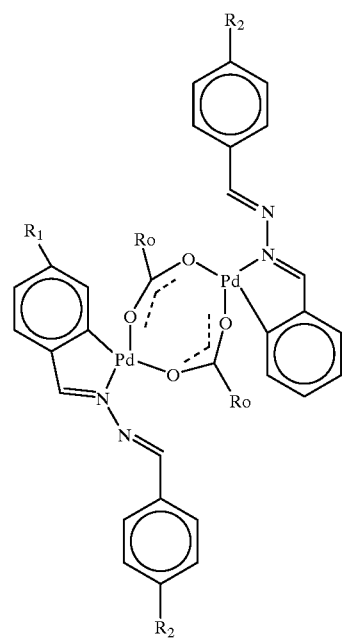

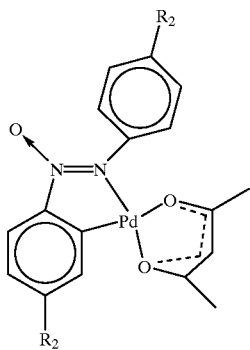

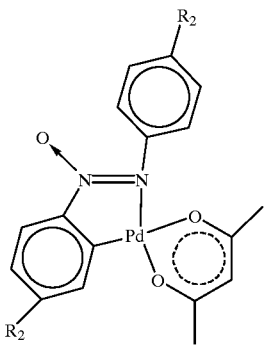

wherein M and $M_1$ is selected from Pt, Pd, Co, Au, or V; R is selected from $C_1$–$C_{10}$ branched or unbranched alkyl groups; Y is halogen; X is selected from $C_1$–$C_4$ alkyl;

Ro is

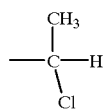

or $OC_mH_{2m+1}$, where m is 1 through 20; $R_1$ is selected from
—$(CH_2)_7CH_3$;
—$(CH_2)_3OCH_2CH_3$ and
$R_2$ is $CH_2=CHCOO(CH_2)_6O$—.

19. A method of making a flexible electrooptical liquid crystal device comprising:
(a) placing a fluid liquid crystal composition comprising liquid crystal, a prepolymer, and microparticles between flexible conductive substrates;
(b) laminating the substrates together; and
(c) curing the fluid liquid crystal composition comprising the prepolymer to form a polymer stabilized liquid crystal,
wherein the lamination in step (b) occurs at a temperature of from 20 to 100 C.

20. The method of claim 19, wherein the microparticles have a particle size of from 5 to 50 microns.

21. The method of claim 19, wherein the curing of step (c) is by ultraviolet radiation or heat treatment.

22. The method of claim 19, wherein the microparticles are coated with adhesive.

23. The method of claim 19, wherein at least one of the flexible conductive substrates comprises a double-sided adhesive tape.

24. The method of claim 19, wherein the prepolymer comprises a UV curable compound selected from

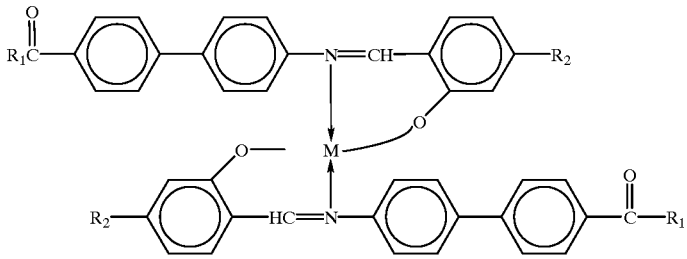

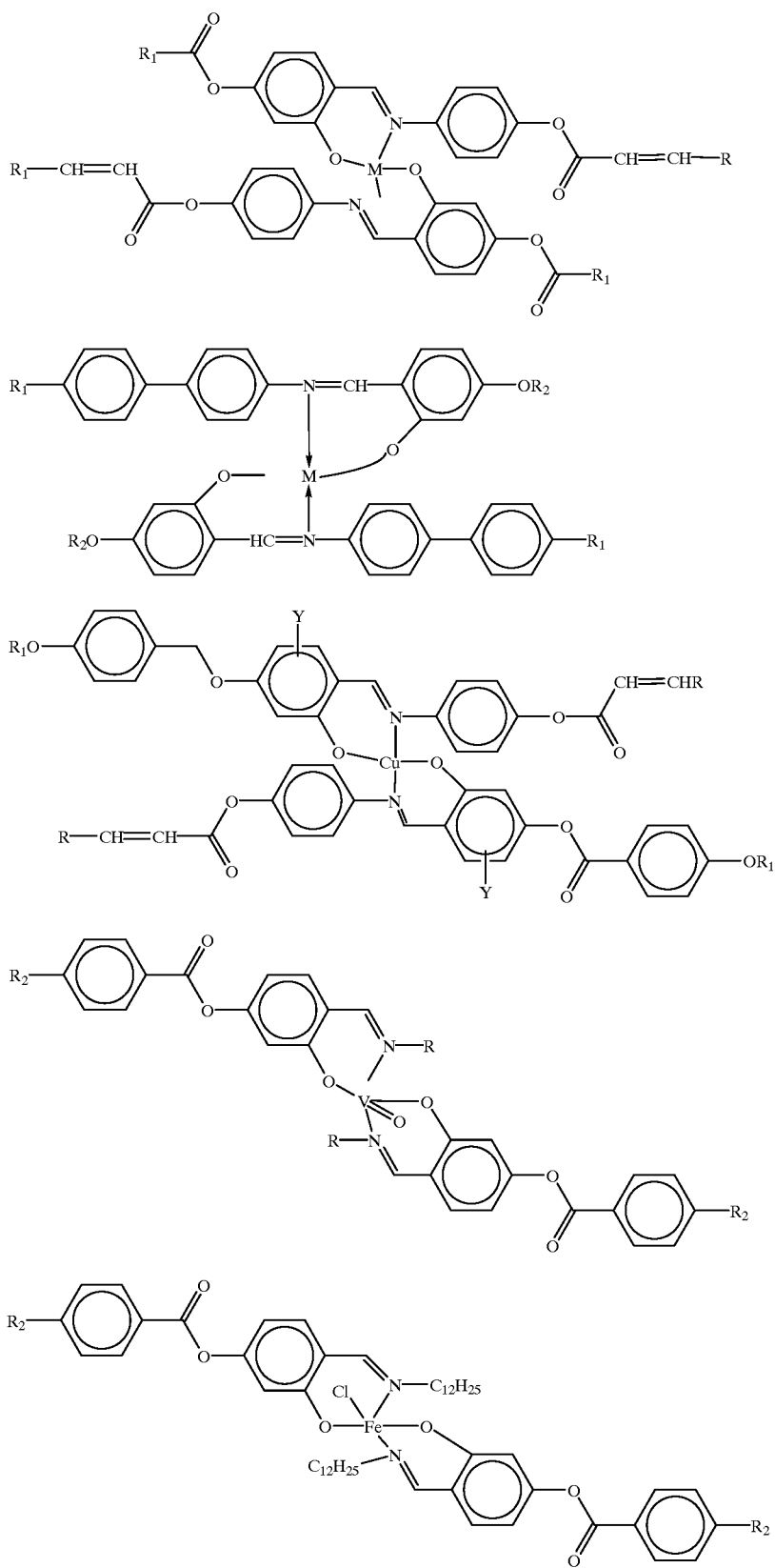

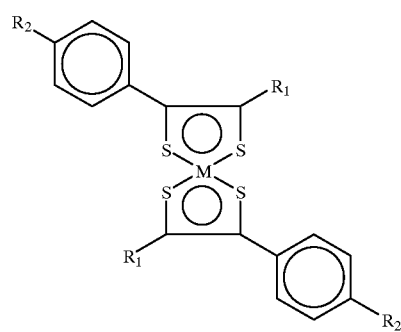
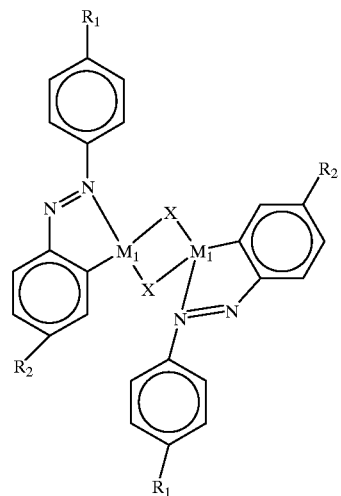
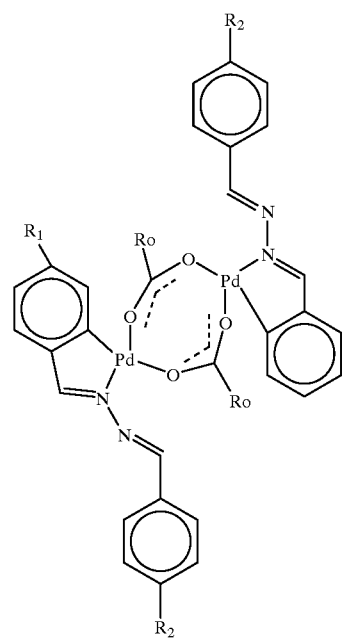

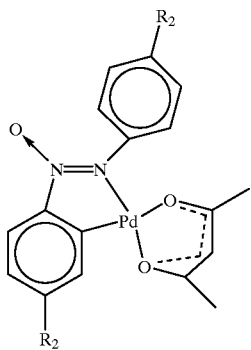

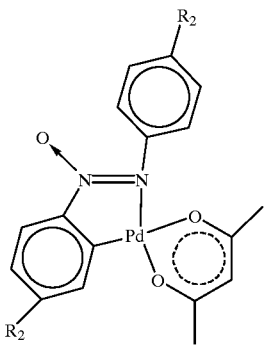

wherein M and $M_1$ is selected from Pt, Pd, Co, Au, or V; R is selected from $C_1$–$C_{10}$ branched or unbranched alkyl groups; Y is halogen; X is selected from $C_1$–$C_4$ alkyl;

Ro is

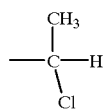

or $OC_mH_{2m+1}$, where m is 1 through 20; $R_1$ is selected from

—$(CH_2)_7CH_3$;

—$(CH_2)_3OCH_2CH_3$ and $R_2$ is $CH_2$=$CHCOO(CH_2)_6O$—.

25. A method of making a flexible electrooptical liquid crystal device comprising:

(a) placing a fluid liquid crystal composition comprising liquid crystal, a prepolymer, and microparticles between flexible conductive substrates;

(b) laminating the substrates together; and (c) curing the fluid liquid crystal composition comprising the prepolymer to form a polymer stabilized liquid crystal, wherein the flexible conductive substrates are polymeric and have a thickness of from 50 to 200 microns.

26. The method of claim 25, wherein the microparticles have a particle size of from 5 to 50 microns.

27. The method of claim 25, wherein the curing of step (c) is by ultraviolet radiation or heat treatment.

28. The method of claim 25, wherein the microparticles are coated with adhesive.

29. The method of claim 25, wherein at least one of the flexible conductive substrates comprises a double-sided adhesive tape.

30. The method of claim 25, wherein the prepolymer comprises a UV curable compound selected from

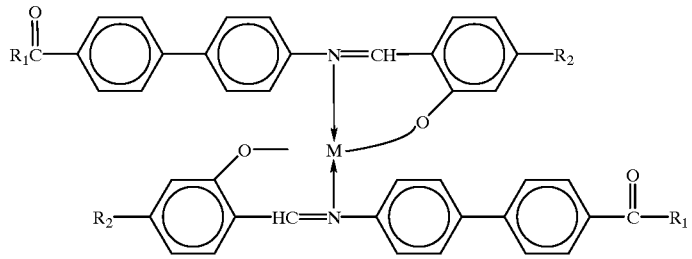

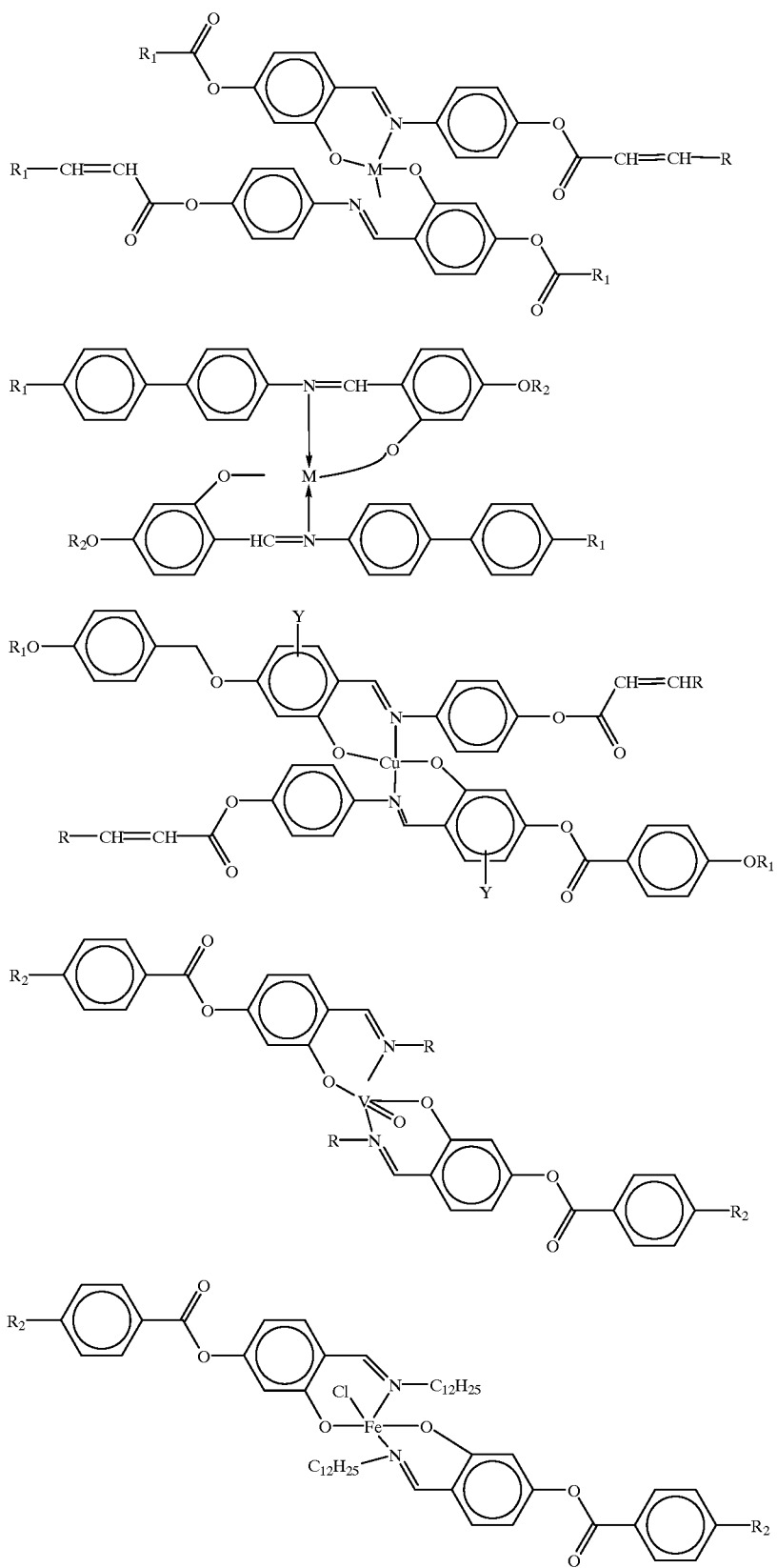

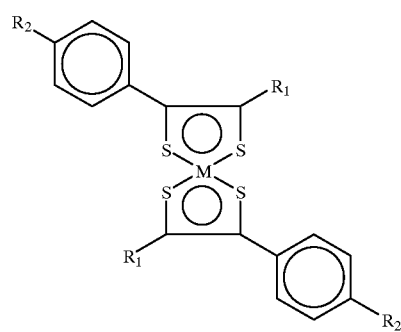
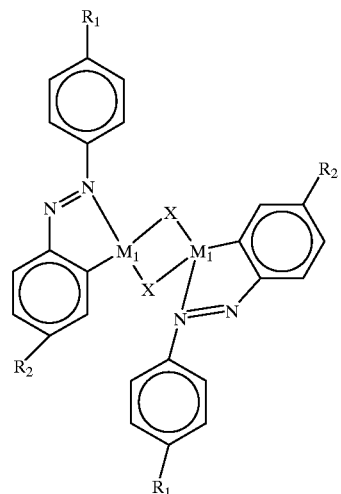
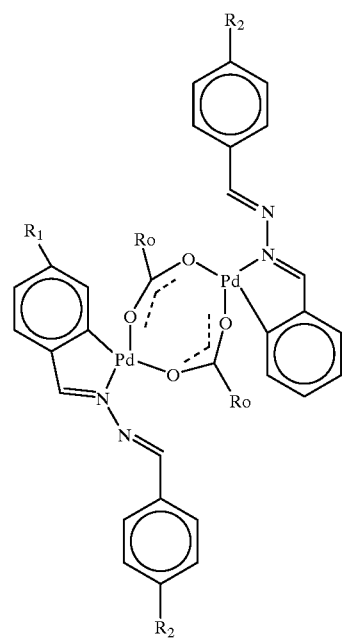

-continued

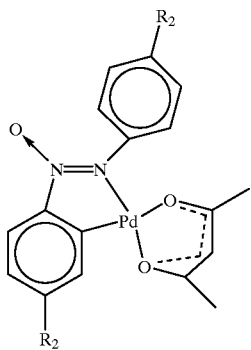

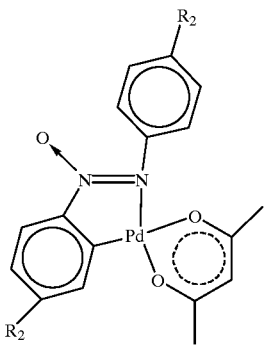

wherein M and $M_1$ is selected from Pt, Pd, Co, Au, or V; R is selected from $C_1$–$C_{10}$ branched or unbranched alkyl groups; Y is halogen; X is selected from $C_1$–$C_4$ alkyl;

Ro is

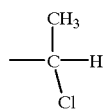

or $OC_mH_{2m+1}$, where m is 1 through 20; $R_1$ is selected from
—$(CH_2)_7CH_3$;
—$(CH_2)_3OCH_2CH_3$ and
$R_2$ is $CH_2$=$CHCOO(CH_2)_6O$—.

31. A method of making a flexible electrooptical liquid crystal device comprising:
 (a) placing a fluid liquid crystal composition comprising liquid crystal, a prepolymer, and microparticles between flexible conductive substrates;
 (b) laminating the substrates together; and
 (c) curing the fluid liquid crystal composition comprising the prepolymer to form a polymer stabilized liquid crystal,
 wherein the flexible conductive substrate is a polyethylene terephthalate film coated with indium-tin oxide.

32. The method of claim 31, wherein the microparticles have a particle size of from 5 to 50 microns.

33. The method of claim 31, wherein the curing of step (c) is by ultraviolet radiation or heat treatment.

34. The method of claim 31, wherein the microparticles are coated with adhesive.

35. The method of claim 31, wherein at least one of the flexible conductive substrates comprises a double-sided adhesive tape.

36. The method of claim 31, wherein the prepolymer comprises a UV curable compound selected from

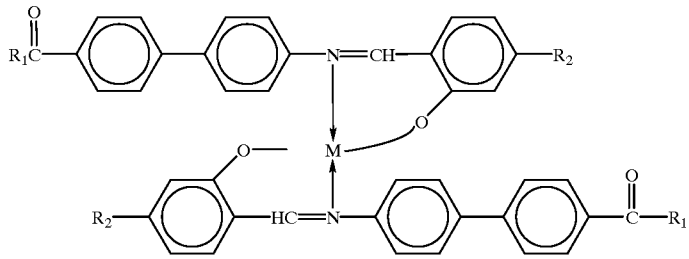

-continued
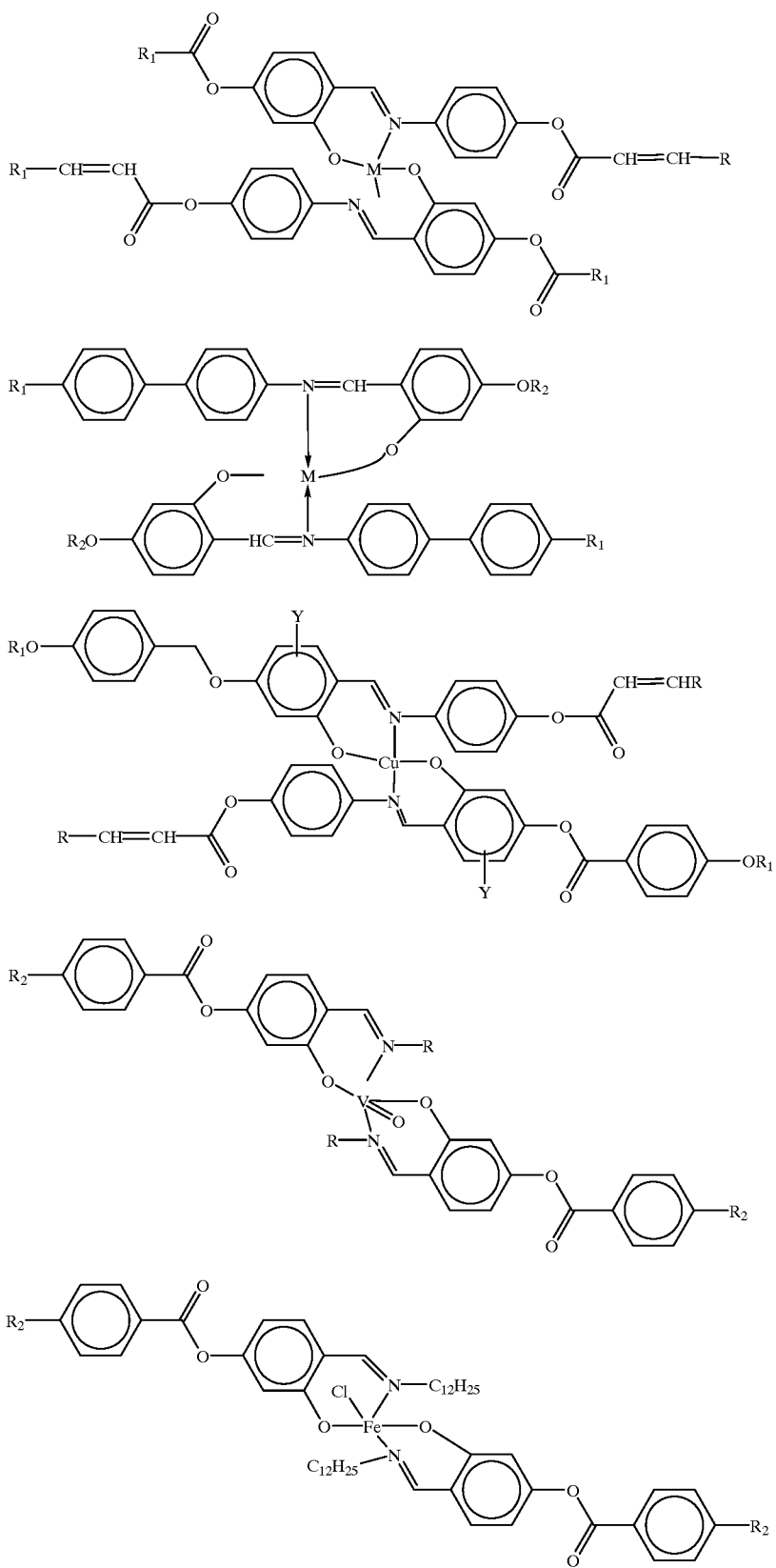

-continued
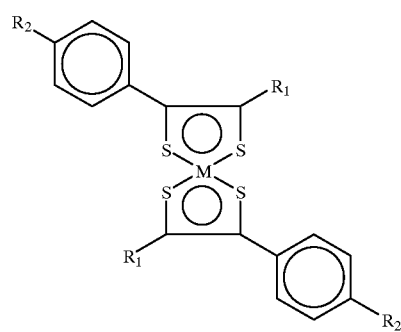
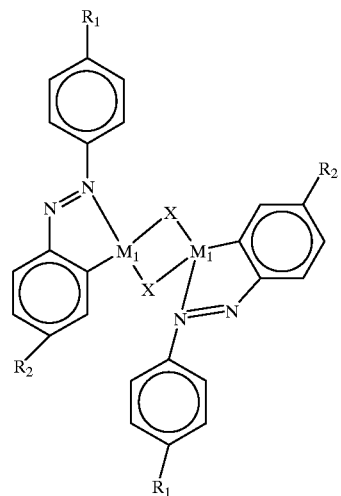
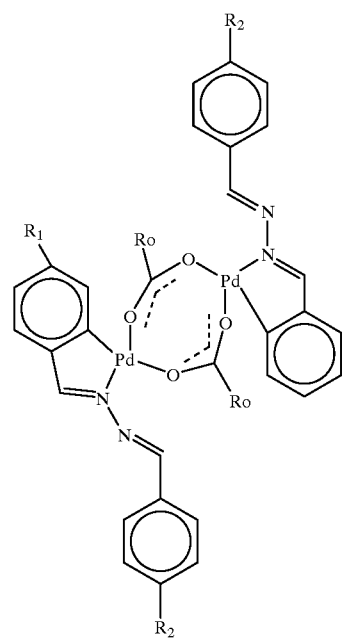

-continued

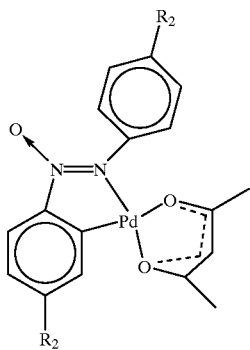

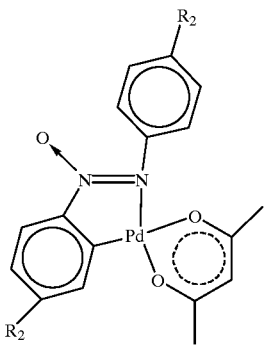

wherein M and $M_1$ is selected from Pt, Pd, Co, Au, or V; R is selected from $C_1$–$C_{10}$ branched or unbranched alkyl groups; Y is halogen; X is selected from $C_1$–$C_4$ alkyl;

Ro is

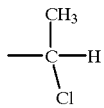

or $OC_mH_{2m+1}$, where m is 1 through 20; $R_1$ is selected from
—$(CH_2)_7CH_3$;
—$(CH_2)_3OCH_2CH_3$ and
$R_2$ is $CH_2$=$CHCOO(CH_2)_6O$—.

37. A method of making a flexible electrooptical liquid crystal device comprising:
(a) placing a fluid liquid crystal composition comprising liquid crystal, a prepolymer, and microparticles between flexible conductive substrates;
(b) laminating the substrates together; and
(c) curing the fluid liquid crystal composition comprising the prepolymer to form a polymer stabilized liquid crystal, wherein the liquid crystal composition is cured by ultraviolet radiation in two steps,
wherein the first step comprises placing a mask over the laminated substrates and selectively exposing the laminated substrates to ultraviolet radiation, and the second step comprises removing the mask and exposing the laminated substrates to ultraviolet radiation.

38. The method of claim 37, wherein the ultraviolet radiation in the first step is of higher intensity than the ultraviolet radiation in the second step.

39. The method of claim 37, wherein the microparticles have a particle size of from 5 to 50 microns.

40. The method of claim 37, wherein the curing of step (c) is by ultraviolet radiation or heat treatment.

41. The method of claim 37, wherein the microparticles are coated with adhesive.

42. The method of claim 37, wherein at least one of the flexible conductive substrates comprises a double-sided adhesive tape.

43. The method of claim 37, wherein the prepolymer comprises a UV curable compound selected from

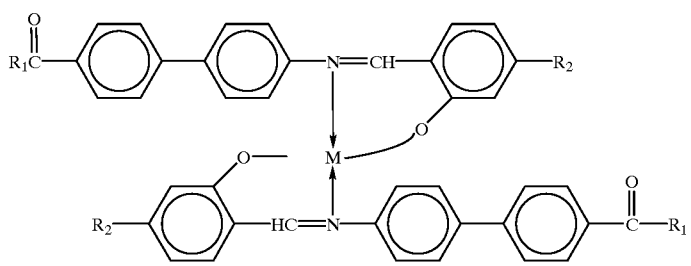

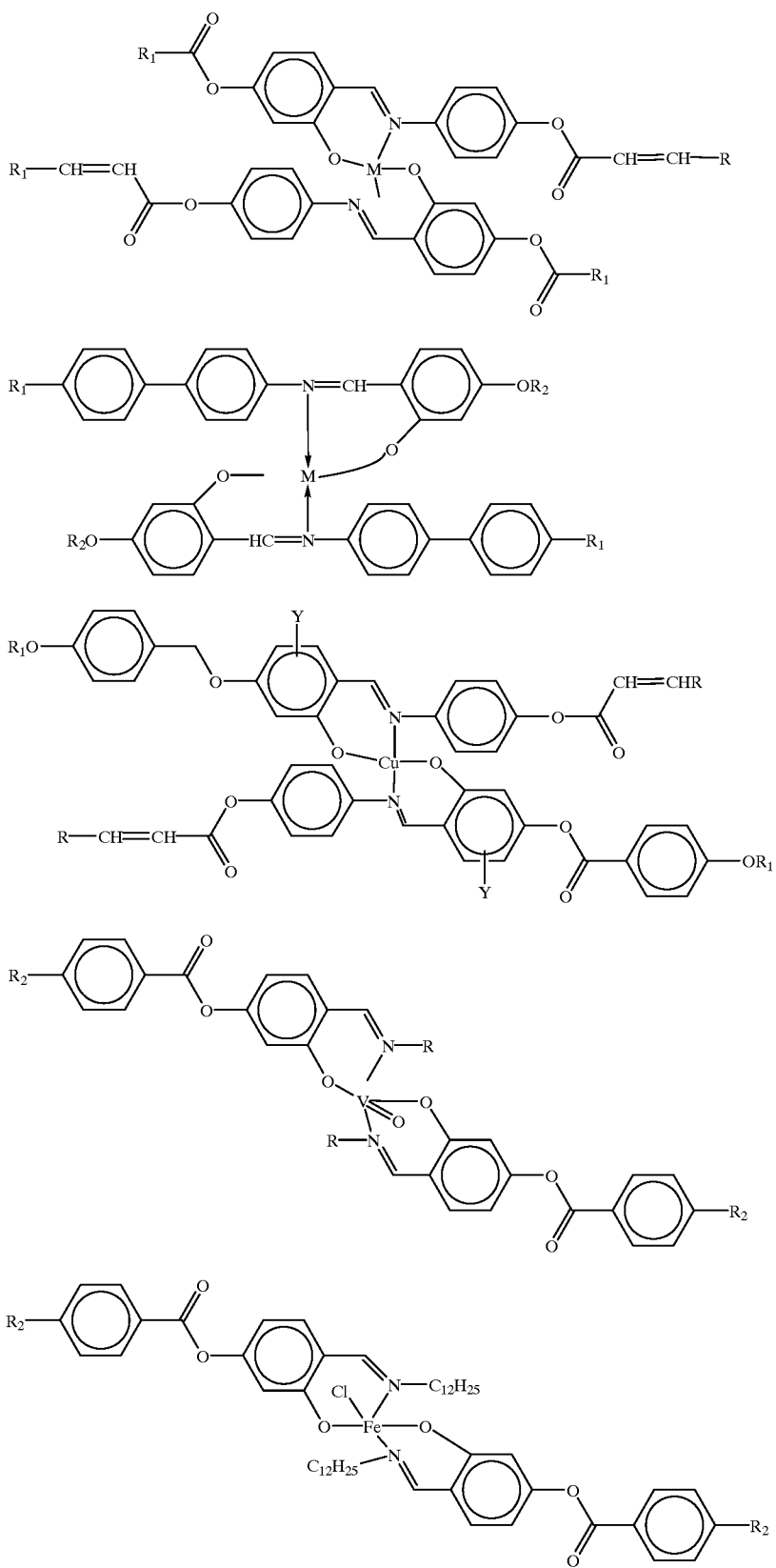

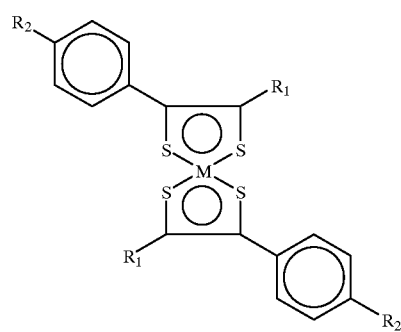
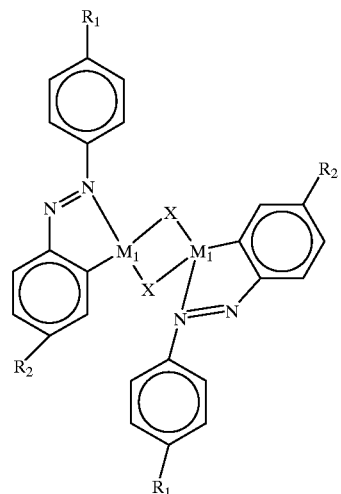
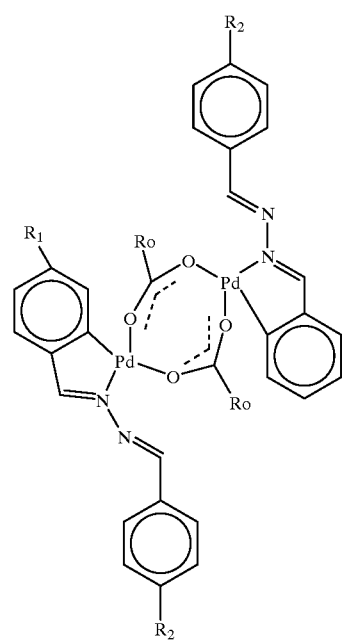

-continued
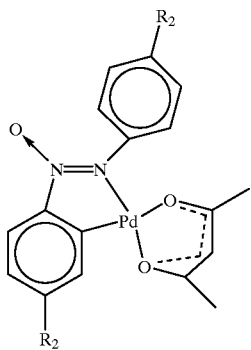
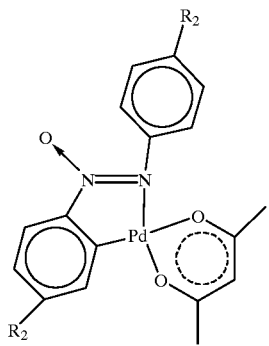
wherein M and $M_1$ is selected from Pt, Pd, Co, Au, or V; R is selected from $C_1$–$C_{10}$ branched or unbranched alkyl groups; Y is halogen; X is selected from $C_1$–$C_4$ alkyl;
Ro is
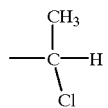
or $OC_mH_{2m+1}$, where m is 1 through 20; $R_1$ is selected from
—$(CH_2)_7CH_3$;
—$(CH_2)_3OCH_2CH_3$ and
$R_2$ is $CH_2$=$CHCOO(CH_2)_6O$—.
* * * * *